United States Patent
Ma et al.

(10) Patent No.: US 12,395,997 B2
(45) Date of Patent: Aug. 19, 2025

(54) COMMUNICATION METHOD AND COMMUNICATIONS APPARATUS

(71) Applicant: Huawei Technologies Co., Ltd., Shenzhen (CN)

(72) Inventors: Ruixiang Ma, Shenzhen (CN); Yan Cheng, Beijing (CN); Xiuqiang Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 379 days.

(21) Appl. No.: 17/739,960

(22) Filed: May 9, 2022

(65) Prior Publication Data
US 2022/0272745 A1 Aug. 25, 2022

Related U.S. Application Data

(63) Continuation of application No. PCT/CN2019/116862, filed on Nov. 8, 2019.

(51) Int. Cl.
*H04W 72/23* (2023.01)
*H04W 48/08* (2009.01)

(52) U.S. Cl.
CPC ........... *H04W 72/23* (2023.01); *H04W 48/08* (2013.01)

(58) Field of Classification Search
CPC .............................. H04W 72/23; H04W 48/08
See application file for complete search history.

(56) References Cited

U.S. PATENT DOCUMENTS

| | | | |
|---|---|---|---|
| 2018/0139774 A1 | 5/2018 | Ma et al. | |
| 2019/0037586 A1* | 1/2019 | Park | H04L 5/00 |
| 2019/0053318 A1 | 2/2019 | Nogami et al. | |
| 2019/0150124 A1 | 5/2019 | Nogami et al. | |

(Continued)

FOREIGN PATENT DOCUMENTS

| | | |
|---|---|---|
| CN | 109309545 A | 2/2019 |
| CN | 109600836 A | 4/2019 |

(Continued)

OTHER PUBLICATIONS

"3rd Generation Partnership Project; Technical Specification Group Radio Access Network; NR; Physical layer procedures for data (Release 15)," 3GPP TS 38.214 V15.7.0, pp. 1-106, 3rd Generation Partnership Project, Valbonne, France (Sep. 2019).

(Continued)

*Primary Examiner* — Blake J Rubin
(74) *Attorney, Agent, or Firm* — Leydig, Voit & Mayer, Ltd.

(57) ABSTRACT

A communication method and a communications apparatus are provided. The method includes: A network device configures a first time domain resource set of a first DCI format and a second time domain resource set of a second format for a terminal device; and the terminal device determines, based on a time domain repetition manner of grant free scheduling, a time domain repetition manner of the first DCI format, and a time domain repetition manner of the second format, an available third time domain resource set from the first time domain resource set and the second time domain resource set, and then receives and sends data by using a time domain resource in the third time domain resource set.

18 Claims, 11 Drawing Sheets

(56) References Cited

U.S. PATENT DOCUMENTS

| | | | |
|---|---|---|---|
| 2019/0207705 A1 | 7/2019 | Zhou et al. | |
| 2019/0306923 A1* | 10/2019 | Xiong | H04L 27/261 |
| 2019/0394759 A1* | 12/2019 | Ying | H04L 1/0061 |
| 2020/0178273 A1* | 6/2020 | Lu | H04L 1/1822 |
| 2020/0280357 A1* | 9/2020 | Bae | H04L 5/0098 |
| 2020/0280971 A1* | 9/2020 | Moon | H04L 5/0053 |
| 2020/0322973 A1* | 10/2020 | Li | H04L 5/0055 |
| 2021/0091890 A1* | 3/2021 | Ren | H04L 1/189 |
| 2021/0160917 A1* | 5/2021 | Goto | H04W 72/0446 |
| 2021/0314104 A1* | 10/2021 | Yin | H04W 72/56 |
| 2022/0167389 A1* | 5/2022 | Kim | H04L 1/1893 |
| 2022/0200734 A1* | 6/2022 | Karaki | H04L 1/1864 |
| 2022/0248399 A1* | 8/2022 | You | H04L 5/0096 |
| 2022/0312481 A1* | 9/2022 | Talarico | H04W 74/0866 |
| 2022/0338222 A1* | 10/2022 | Kim | H04W 72/1273 |

FOREIGN PATENT DOCUMENTS

| | | |
|---|---|---|
| CN | 110035542 A | 7/2019 |
| CN | 110099445 A | 8/2019 |
| RU | 2701383 C1 | 9/2019 |

OTHER PUBLICATIONS

"Remaining issues on resource allocation and TBS," 3GPP TSG RAN WG1 Meeting #92bis, Sanya, China, R1-1803709, Total 9 pages, 3rd Generation Partnership Project, Valbonne, France (Apr. 16-20, 2018).

"3rd Generation Partnership Project; Technical Specification Group Radio Access Network; NR; Physical layer procedures for control (Release 15)," 3GPP TS 38.213 V15.7.0, pp. 1-108, 3rd Generation Partnership Project, Valbonne, France (Sep. 2019).

* cited by examiner

COMMUNICATION METHOD AND COMMUNICATIONS APPARATUS

CROSS-REFERENCE TO RELATED APPLICATIONS

This application is a continuation of International Application No. PCT/CN2019/116862, filed on Nov. 8, 2019, the disclosure of which is hereby incorporated by reference in its entirety.

TECHNICAL FIELD

Embodiments of this application relate to the field of communications technologies, and in particular, to a communication method and a communications apparatus.

BACKGROUND

In a current new radio (NR) system, a time domain resource of a data channel may be predefined by using a protocol and/or dynamically indicated by using higher layer signaling. The dynamic indication by using higher layer signaling may be that after a terminal device and a base station establish an RRC connection, the base station configures a time domain resource set (for example, a time domain resource table) for the terminal device by using RRC signaling. Currently, the base station may configure, for the terminal device by using RRC signaling, a time domain resource set corresponding to a specific format. For example, the base station may configure a first time domain resource table in DCI format 0_1 and a second time domain resource table in DCI format 0_2. However, time domain resources corresponding to some rows in the time domain resource table may be inapplicable to DCI in a specific downlink control information (DCI) format. For example, when DCI format 0_1 or DCI format 1_1 is configured as a slot-level time domain repetition manner, some cross-boundary time domain resources in the time domain resource table may not be suitable for use. In view of this, a mechanism needs to be provided to ensure that the terminal device and the base station select proper time domain resources to transmit data.

SUMMARY

Embodiments of this application provide a communication method and a communications apparatus, to provide a manner of determining a time domain resource, so as to improve reliability of communication between a terminal device and a network device.

According to a first aspect, a communication method is provided, and the method may be performed by a terminal device. The method includes: determining, by the terminal device, at least one time domain resource set, where each of the at least one time domain resource set corresponds to one DCI format. Then, the terminal device determines a third time domain resource set for grant free scheduling based on the at least one time domain resource set, and the terminal device determines a third time domain resource from the third time domain resource set, and sends uplink data to a network device on the third time domain resource, or receives downlink data on the third time domain resource.

In this embodiment of this application, the network device and the terminal device determine the time domain resource set by using a same rule, so that it can be ensured that time domain resource sets determined by the network device and the terminal device are consistent, thereby ensuring that a same data resource is determined and ensuring normal communication. In addition, because time domain resources in time domain resource sets corresponding to different time domain repetition manners have different features, selecting time domain resource sets with a same repetition manner can ensure the time domain repetition manner and ensure that all time domain resources in the time domain resource sets can conform to a feature of the time domain repetition manner, thereby ensuring normal communication.

In a possible design, the at least one time domain resource set is one time domain resource set, and is a first time domain resource set corresponding to a first DCI format. The terminal device may further receive first indication information from the network device, where the first indication information is used to indicate a time domain repetition manner of grant free scheduling. The terminal device determines the third time domain resource set for grant free scheduling based on the time domain repetition manner of grant free scheduling and the at least one time domain resource set. For example, the base station sends the first indication information to the terminal, and the first indication information is used to notify the terminal device that the time domain repetition manner is a slot-level time domain repetition manner. In this case, the terminal may determine, based on the first indication information, a time domain resource corresponding to the slot-level time domain repetition manner. This manner is relatively simple and direct.

In a possible design, in addition to sending the first indication information to the terminal device, the network device may send second indication information to the terminal device. The second indication information is used to indicate a time domain repetition manner of the first DCI format, and is used to indicate a time domain repetition manner of a second DCI format. Then, when determining that the time domain repetition manner of grant free scheduling, the time domain repetition manner of the first DCI format, and the repetition manner of the second DCI format meet Rule 1, the terminal device determines that the at least one time domain resource set is the third time domain resource set for grant free scheduling. Rule 1: The time domain repetition manner of grant free scheduling, the time domain repetition manner of the first DCI format, and the repetition manner of the second DCI format are all the same or all different, and there is no time domain resource set specific to the second DCI format.

The first indication information and the second indication information may be same indication information, or may be different fields included in a same piece of signaling, or may be information sent by using different pieces of signaling. This is not limited in this embodiment of the present invention.

In a possible design, when the at least one time domain resource set includes two time domain resource sets, the two time domain resource sets include a first time domain resource set corresponding to a first DCI format and a second time domain resource set corresponding to a second DCI format. The terminal device selects, from the two time domain resource sets, the second time domain resource set corresponding to the second DCI format as the third time domain resource set. Determining a time domain resource in this manner is simple and direct, and does not require excessive interaction between the base station and the terminal, thereby reducing signaling overheads.

In a possible design, when the at least one time domain resource set includes two time domain resource sets, the two time domain resource sets include a first time domain resource set corresponding to a first DCI format and a second time domain resource set corresponding to a second DCI format. The terminal device may further receive third indication information from the network device, where the third indication information is used to indicate that one of the two time domain resource sets is the third time domain resource set. In this embodiment of this application, the third indication information is used to indicate a time domain resource, and there is no need to perform excessive interaction between the base station and the terminal, thereby reducing signaling overheads.

The first indication information and the third indication information may be same indication information, or may be different fields included in a same piece of signaling, or may be information sent by using different pieces of signaling. This is not limited in this embodiment of the present invention.

In a possible design, in addition to sending the first indication information to the terminal device, the network device may send second indication information to the terminal device. The second indication information is used to indicate a time domain repetition manner of the first DCI format, and is used to indicate a time domain repetition manner of the second DCI format. The terminal device determines the third time domain resource set based on the time domain repetition manner of grant free scheduling, the time domain repetition manner of the first DCI format, and the time domain repetition manner of the second format. In this embodiment of this application, the base station does not need to specially indicate a time domain resource determining rule to the terminal, and the terminal can determine the time domain resource based on a feature of the time domain repetition manner. In this manner, there is no need to perform excessive signaling interaction between the base station and the terminal, so that signaling overheads can be reduced.

In a possible design, a first manner in which the terminal device determines the third time domain resource set based on the time domain repetition manner of grant free scheduling, the time domain repetition manner of the first DCI format, and the time domain repetition manner of the second format is as follows: The terminal device determines, from the first time domain resource set and the second time domain resource set, a time domain resource set corresponding to a DCI format whose time domain repetition manner is the same as the time domain repetition manner of grant free scheduling as the third time domain resource set. According to this embodiment of this application, implementation complexity of the base station and the terminal can be reduced.

In a possible design, a second manner in which the terminal device determines the third time domain resource set based on the time domain repetition manner of grant free scheduling, the time domain repetition manner of the first DCI format, and the time domain repetition manner of the second format is as follows: The terminal device determines, from the first time domain resource set and the second time domain resource set, a time domain resource set corresponding to a DCI format whose time domain repetition manner is the same as the time domain repetition manner of grant free scheduling as the third time domain resource set. When both the time domain repetition manner of the first DCI format and the time domain repetition manner of the second DCI format are the same as the time domain repetition manner of grant free scheduling, the terminal device determines the second time domain resource set as the third time domain resource set, or the terminal device determines the first time domain resource set as the third time domain resource set. In this manner, excessive signaling interaction between the base station and the terminal is not required, and signaling overheads can be reduced.

In a possible design, a third manner in which the terminal device determines the third time domain resource set based on the time domain repetition manner of grant free scheduling, the time domain repetition manner of the first DCI format, and the time domain repetition manner of the second format is as follows: The terminal device determines, from the first time domain resource set and the second time domain resource set, a time domain resource set corresponding to a DCI format whose time domain repetition manner is the same as the time domain repetition manner of grant free scheduling as the third time domain resource set. When both the time domain repetition manner of the first DCI format and the time domain repetition manner of the second DCI format are different from the time domain repetition manner of grant free scheduling, the terminal device determines the second time domain resource set as the third time domain resource set, or the terminal device determines the first time domain resource set as the third time domain resource set. In this manner, excessive signaling interaction between the base station and the terminal is not required, and signaling overheads can be reduced.

In a possible design, a fourth manner in which the terminal device determines the third time domain resource set based on the time domain repetition manner of grant free scheduling, the time domain repetition manner of the first DCI format, and the time domain repetition manner of the second format is as follows: The terminal device determines, from the first time domain resource set and the second time domain resource set, a time domain resource set corresponding to a DCI format whose time domain repetition manner is the same as the time domain repetition manner of grant free scheduling as the third time domain resource set. When both the time domain repetition manner of the first DCI format and the time domain repetition manner of the second DCI format are different from the time domain repetition manner of grant free scheduling, the terminal device determines a fourth time domain resource set predefined in a protocol as the third time domain resource set. Alternatively, the terminal device determines a fourth time domain resource set preconfigured by using higher layer signaling as the third time domain resource set. In this manner, excessive signaling interaction between the base station and the terminal is not required, and signaling overheads can be reduced.

According to a second aspect, a communication method is provided, and the method may be performed by a base station. The method includes: determining, by the network device, at least one time domain resource set, where each of the at least one time domain resource set corresponds to one DCI format. Then, the network device determines a third time domain resource set for grant free scheduling based on the at least one time domain resource set, and the network device determines a third time domain resource from the third time domain resource set, and sends downlink data to a terminal device on the third time domain resource, or receives uplink data on the third time domain resource. For technical effects of this embodiment of this application, refer to the terminal device side in the first aspect. The network device and the terminal device determine the time domain resource set by using a same rule, so that it can be ensured that time domain resource sets determined by the network device and the terminal device are consistent, thereby ensuring that a same data resource is determined and ensuring normal communication. In addition, because time domain resources in time domain resource sets corresponding to different time domain repetition manners have different features, selecting time domain resource sets with a same repetition manner can ensure the time domain repetition manner and ensure that all time domain resources in the time domain resource sets can conform to a feature of the time domain repetition manner, thereby ensuring normal communication.

It should be noted that, for various possible designs and beneficial effects of determining, by the terminal device, the third time domain resource set for grant free scheduling based on the at least one time domain resource set, refer to the design and the beneficial effects of the terminal device in the embodiment of the first aspect. Details are not described herein again.

According to a third aspect, a communication method is provided, and the method is performed by a terminal device. The method includes: A network device configures two time domain resource sets for a terminal device by using RRC signaling; the network device sends DCI in a third DCI format to the terminal device; and after receiving the two time domain resource sets, the terminal device determines a third time domain resource set corresponding to the DCI in the third DCI format, where the third time domain resource set is one of the two time domain sets. Then, the terminal device determines a third time domain resource from the third time domain resource set, and sends uplink data on the third time domain resource, or receives downlink data on the third time domain resource.

In this embodiment of this application, the terminal device selects, from the two time domain resource sets, a time domain resource corresponding to a row that conforms to the time domain repetition manner corresponding to the DCI format. Determining the time domain resource in this manner is simple and direct, and does not require excessive interaction between the base station and the terminal, thereby reducing signaling overheads.

In a possible design, in addition to receiving the DCI, the terminal device receives sixth indication information, where the sixth indication information is used to indicate a time domain repetition manner of a first DCI format and a time domain repetition manner of a second DCI format. The terminal device may determine the third time domain resource set based on the time domain repetition manners of the DCI formats. In this embodiment of this application, the sixth indication information is used to indicate the time domain repetition manner. The base station does not need to specially indicate a time domain resource determining rule to the terminal, and the terminal can determine the time domain resource based on a feature of the time domain repetition manner. In this manner, there is no need to perform excessive signaling interaction between the base station and the terminal, so that signaling overheads can be reduced.

In a possible design, a first manner in which the terminal device may determine the third time domain resource set based on the time domain repetition manner of the DCI format is as follows: The terminal device determines a time domain resource set corresponding to a mini-slot-level repetition manner as the third time domain resource set. Further, the terminal device may determine a time domain resource from the time domain resource set corresponding to the mini-slot-level repetition manner.

In a possible design, a second manner in which the terminal device may determine the third time domain resource set based on the time domain repetition manner of the DCI format is as follows: The terminal device determines a time domain resource set corresponding to a slot-level repetition manner as the third time domain resource set.

In a possible design, a third manner in which the terminal device may determine the third time domain resource set based on the time domain repetition manner of the DCI format is as follows: The terminal device determines a time domain resource set corresponding to a mini-slot-level repetition manner as the third time domain resource set, and if there is no time domain resource set corresponding to the mini-slot-level repetition manner, the terminal device determines a time domain resource set predefined in a protocol as the third time domain resource set.

In a possible design, a fourth manner in which the terminal device may determine the third time domain resource set based on the time domain repetition manner of the DCI format is as follows: The terminal device determines a time domain resource set corresponding to a slot-level repetition manner as the third time domain resource set, and if there is no time domain resource set corresponding to the slot-level repetition manner, the terminal device determines a time domain resource set predefined in a protocol as the third time domain resource set.

It should be noted that the terminal device may select the foregoing plurality of manners to determine the third time domain resource set. In other words, the foregoing manners may be combined for use.

In a possible embodiment, the terminal device receives seventh indication information, where the seventh indication information may indicate a time domain resource set of the third DCI format. For example, the seventh indication information may indicate a specific time domain resource set, or may indicate a specific time domain resource set in the two time domain resource sets. The terminal device determines the third time domain resource set based on the seventh indication information. In this embodiment of this application, the seventh indication information is used to indicate a time domain resource, and there is no need to perform excessive interaction between the base station and the terminal, thereby reducing signaling overheads.

In a possible embodiment, the terminal device does not select the time domain resource set from the two time domain resource sets configured by the network device, but uses a time domain resource set predefined in a protocol as the third time domain resource set. The base station does not need to specially indicate a time domain resource determining rule to the terminal, and the terminal can determine the time domain resource based on the time domain resource set predefined in the protocol. In this manner, there is no need to perform excessive signaling interaction between the base station and the terminal, so that signaling overheads can be reduced.

According to a fourth aspect, a communication method is provided, and the method may be performed by a base station. The method includes: The network device determines two time domain resource sets; and the network device sends DCI in a third DCI format to a terminal device. Then the network device determines a third time domain resource set corresponding to the DCI in the third DCI format, where the third time domain resource set is one of the two time domain sets. The network device determines a third time domain resource from the third time domain resource set, and sends downlink data on the third time domain resource, or receives uplink data on the third time domain resource. For technical effects of this embodiment of this application, refer to the terminal device side in the third aspect. The terminal device and the network device determine the third time domain resource set by using a same method, to perform data transmission. This can ensure that the base station and the user have a consistent understanding, and ensure communication reliability.

It should be noted that, for various possible designs and beneficial effects of determining, by the terminal device, the third time domain resource set based on the at least one time domain resource set, refer to the design and the beneficial effects of the terminal device in the embodiment of the third aspect. Details are not described herein again.

According to a fifth aspect, a communication method is provided, and the method is performed by a terminal device. The method includes: The terminal device receives DCI from a network device; the terminal device determines a second time domain resource set from a first time domain resource set based on a first DCI format of the DCI; and the terminal device determines a second time domain resource from the second time domain resource set, and receives downlink data on the second time domain resource, or sends uplink data on the second time domain resource. In this embodiment of this application, assuming that higher layer signaling is used to configure only one time domain resource table for a terminal device in an uplink, the terminal device may select an available time domain resource corresponding to a time domain repetition manner, to improve communication reliability.

In a possible embodiment, the terminal device may further receive fourth indication information from the network device, where the fourth indication information is used to indicate a time domain repetition manner of DCI. The terminal device may determine the second time domain resource set from the first time domain resource set based on the first DCI format of the DCI and the time domain repetition manner of the DCI.

In a possible embodiment, a first manner of determining, by the terminal device, the second time domain resource set from the first time domain resource set based on the first DCI format of the DCI and the time domain repetition manner of the DCI is: When the first DCI format of the DCI delivered by the network device is a normal DCI format or a compact DCI format (that is, DCI format 0_1, DCI format 0_2, DCI format 1_1, or DCI format 1_2), and when the fourth indication information indicates that the time domain repetition manner of the DCI is a slot-level repetition manner, the terminal device determines, from the first time domain resource set, a time domain resource that does not cross a slot boundary as the second time domain resource.

In a possible embodiment, a second manner of determining, by the terminal device, the second time domain resource set from the first time domain resource set based on the first DCI format of the DCI and the time domain repetition manner of the DCI is: When the first DCI format of the DCI delivered by the network device is a normal DCI format or a compact DCI format (that is, DCI format 0_1, DCI format 0_2, DCI format 1_1, or DCI format 1_2), and when the fourth indication information indicates that the time domain repetition manner of the DCI is a slot-level repetition manner, the terminal device determines, from the first time domain resource set, a time domain resource that does not include repetition quantity information as the second time domain resource.

In a possible embodiment, a third manner of determining, by the terminal device, the second time domain resource set from the first time domain resource set based on the first DCI format of the DCI and the time domain repetition manner of the DCI is: When the first DCI format of the DCI delivered by the network device is any one of DCI format 0_1, DCI format 0_2, DCI format 1_1, and DCI format 1_2, and the time domain repetition manner of the DCI is a mini-slot-level repetition manner, the terminal device determines, from the first time domain resource set, a time domain resource whose mapping type is mapping type B as the second time domain resource, or the terminal device determines, from the first time domain resource set, a time domain resource that does not include repetition quantity information as the second time domain resource.

In a possible embodiment, a fourth manner of determining, by the terminal device, the second time domain resource set from the first time domain resource set based on the first DCI format of the DCI and the time domain repetition manner of the DCI is: When the first DCI format of the DCI delivered by the network device is a fallback DCI format (that is, DCI format 0_0 or DCI format 10), the terminal device determines, from the first time domain resource set, a time domain resource that does not cross a slot boundary as the second time domain resource.

In a possible embodiment, a fifth manner of determining, by the terminal device, the second time domain resource set from the first time domain resource set based on the first DCI format of the DCI and the time domain repetition manner of the DCI is: When the first DCI format of the DCI delivered by the network device is a fallback DCI format (that is, DCI format 0_0 or DCI format 10), the terminal device determines, from the first time domain resource set, a time domain resource that does not include repetition quantity information as the second time domain resource.

In a possible embodiment, a sixth manner of determining, by the terminal device, the second time domain resource set from the first time domain resource set based on the first DCI format of the DCI and the time domain repetition manner of the DCI is: When the first DCI format of the DCI delivered by the network device is a fallback DCI format (that is, DCI format 0_0 or DCI format 1_0), the terminal device determines the second time domain resource from a time domain resource table predefined in a protocol.

In a possible embodiment, when determining that the first DCI format of the DCI is DCI in the fallback DCI format, the terminal device further needs to determine whether the DCI meets a first condition. If the DCI meets the first condition, the second time domain resource is determined according to the corresponding method in Manner 4 to Manner 6.

The first condition is: A scrambling manner of the DCI is any one of a C-RNTI, an MCS-C-RNTI, a TC-RNTI, and a CS-RNTI, and a PDCCH corresponding to the DCI is received in a first search space, where the first search space is a common search space (CSS), and a control resource set CORESET associated with the CSS is not CORESET 0; or the first search space is a terminal device-specific search space (USS).

According to a sixth aspect, a communication method is provided, and the method may be performed by a base station. The method includes: The network device sends DCI to a terminal device; the network device determines a second time domain resource set from a first time domain resource set based on a first DCI format of the DCI; and the network device determines a second time domain resource from the second time domain resource set, and receives uplink data on the second time domain resource, or sends downlink data on the second time domain resource. For technical effects of this embodiment of this application, refer to the terminal device side in the fifth aspect. The terminal device and the network device determine the third time domain resource set by using a same method, to perform data transmission. This can ensure that the base station and the user have a consistent understanding, and ensure communication reliability.

It should be noted that, for various possible designs and beneficial effects of determining, by the terminal device, the second time domain resource set based on the at least one time domain resource set, refer to the design and the beneficial effects of the terminal device in the embodiment of the fifth aspect. Details are not described herein again.

According to a seventh aspect, an embodiment of this application provides a communications apparatus. The communications apparatus includes a processor, the processor is coupled to a memory, and the memory is configured to store an instruction. The processor is configured to execute the instruction stored in the memory, to perform the method in any one of the foregoing aspects or the possible designs of the foregoing aspects. Optionally, the communications apparatus may further include a transceiver, configured to support the communications apparatus in sending and/or receiving the information in the foregoing method. Optionally, the communications apparatus may be a terminal device, or may be an apparatus, for example, a chip or a chip system, in a terminal device. The chip system includes at least one chip, and the chip system may further include another circuit structure and/or discrete component.

According to an eighth aspect, a communications apparatus is provided. For beneficial effects, refer to the description in the first aspect. Details are not described herein again. The communications apparatus has a function of implementing an action in the method example in the first aspect. The function may be implemented by hardware, or may be implemented by hardware executing corresponding software. The hardware or the software includes one or more modules corresponding to the foregoing functions. In a possible design, the apparatus may include modules that are in a one-to-one correspondence with the method/operations/steps/actions described in the first aspect. The modules may be implemented by a hardware circuit, software, or a combination of a hardware circuit and software. For example, the apparatus may include a transceiver module and a processing module. The processing module is configured to: determine at least one time domain resource set, where each of the at least one time domain resource set corresponds to one DCI format; determine a third time domain resource set for grant free scheduling based on the at least one time domain resource set; and determine a third time domain resource from the third time domain resource set. The transceiver module is configured to: send uplink data to a network device on the third time domain resource, or receive downlink data on the third time domain resource. For specific functions of the processing module and the transceiver module, refer to the description in the first aspect. Details are not described herein again.

According to a ninth aspect, a communications apparatus is provided. For beneficial effects, refer to the description in the second aspect. Details are not described herein again. The communications apparatus has a function of implementing an action in the method example in the first aspect. The function may be implemented by hardware, or may be implemented by hardware executing corresponding software. The hardware or the software includes one or more modules corresponding to the foregoing functions. In a possible design, the apparatus may include modules that are in a one-to-one correspondence with the method/operations/steps/actions described in the second aspect. The modules may be implemented by a hardware circuit, software, or a combination of a hardware circuit and software. For example, the apparatus may include a processing module. The processing module is configured to: determine at least one time domain resource set, where each of the at least one time domain resource set corresponds to one DCI format; determine a third time domain resource set for grant free scheduling based on the at least one time domain resource set; and determine a third time domain resource from the third time domain resource set. The transceiver module is configured to: send downlink data to a terminal device on the third time domain resource, or receive uplink data on the third time domain resource. For specific functions of the processing module and the transceiver module, refer to the description in the second aspect. Details are not described herein again.

According to a tenth aspect, a communications apparatus is provided. For beneficial effects, refer to the description in the third aspect. Details are not described herein again. The communications apparatus has a function of implementing an action in the method example in the third aspect. The function may be implemented by hardware, or may be implemented by hardware executing corresponding software. The hardware or the software includes one or more modules corresponding to the foregoing functions. In a possible design, the apparatus may include modules that are in a one-to-one correspondence with the method/operations/steps/actions described in the third aspect. The modules may be implemented by a hardware circuit, software, or a combination of a hardware circuit and software. For example, the apparatus may include a transceiver module and a processing module. The processing module is configured to configure two time domain resource sets for a terminal device by using RRC signaling. The transceiver module is configured to send DCI in a third DCI format to the terminal device. The processing module is configured to: after the transceiver module receives the two time domain resource sets, determine a third time domain resource set corresponding to the DCI in the third DCI format, where the third time domain resource set is one of the two time domain sets; and determine a third time domain resource from the third time domain resource set. The processing module is configured to send uplink data on the third time domain resource, or receive downlink data on the third time domain resource. For functions of the transceiver module and the processing module, refer to the third aspect and the description in the third aspect. Details are not described herein again.

According to an eleventh aspect, a communications apparatus is provided. For beneficial effects, refer to the description in the fourth aspect. Details are not described herein again. The communications apparatus has a function of implementing an action in the method example in the fourth aspect. The function may be implemented by hardware, or may be implemented by hardware executing corresponding software. The hardware or the software includes one or more modules corresponding to the foregoing functions. In a possible design, the apparatus may include modules that are in a one-to-one correspondence with the method/operations/steps/actions described in the fourth aspect. The modules may be implemented by a hardware circuit, software, or a combination of a hardware circuit and software. For example, the apparatus may include a processing module and a transceiver module. The processing module is configured to determine two time domain resource sets, and the transceiver module is configured to send DCI in a third DCI format to a terminal device. The processing module is further configured to: determine a third time domain resource set corresponding to the DCI in the third DCI format, and determine a third time domain resource from the third time domain resource set, where the third time domain resource set is one of the two time domain sets. The transceiver module is configured to send downlink data on the third time domain resource, or receive uplink data on the third time domain resource. For specific functions of the processing module and the transceiver module, refer to the description in the fourth aspect. Details are not described herein again.

According to a twelfth aspect, a communications apparatus is provided. For beneficial effects, refer to the description in the fifth aspect. Details are not described herein again. The communications apparatus has a function of implementing an action in the method example in the first aspect. The function may be implemented by hardware, or may be implemented by hardware executing corresponding software. The hardware or the software includes one or more modules corresponding to the foregoing functions. In a possible design, the apparatus may include modules that are in a one-to-one correspondence with the method/operations/steps/actions described in the fifth aspect. The modules may be implemented by a hardware circuit, software, or a combination of a hardware circuit and software. For example, the apparatus may include a transceiver module and a processing module. The transceiver module is configured to receive DCI from a network device. The processing module is configured to: determine a second time domain resource set from a first time domain resource set based on a first DCI format of the DCI, and determine a second time domain resource from the second time domain resource set. The transceiver module is configured to: receive downlink data on the second time domain resource, or send uplink data on the second time domain resource. For functions of the transceiver module and the processing module, refer to the fifth aspect and the description in the fifth aspect. Details are not described herein again.

According to a thirteenth aspect, a communications apparatus is provided. For beneficial effects, refer to the description in the sixth aspect. Details are not described herein again. The communications apparatus has a function of implementing an action in the method example in the first aspect. The function may be implemented by hardware, or may be implemented by hardware executing corresponding software. The hardware or the software includes one or more modules corresponding to the foregoing functions. In a possible design, the apparatus may include modules that are in a one-to-one correspondence with the method/operations/steps/actions described in the sixth aspect. The modules may be implemented by a hardware circuit, software, or a combination of a hardware circuit and software. For example, the apparatus may include a transceiver module. The transceiver module is configured to send DCI to a terminal device. The processing module is configured to: determine a second time domain resource set from a first time domain resource set based on a first DCI format of the DCI, and determine a second time domain resource from the second time domain resource set. The transceiver module is configured to: receive uplink data on the second time domain resource, or send downlink data on the second time domain resource. For specific functions of the processing module and the transceiver module, refer to the description in the sixth aspect. Details are not described herein again.

According to a fourteenth aspect, an embodiment of this application further provides a computer readable storage medium, including an instruction. When the instruction is run on a computer, the computer is enabled to perform the method in any one of the first aspect or the possible designs of the first aspect, the method in any one of the second aspect or the possible designs of the second aspect, the method in any one of the third aspect or the possible designs of the third aspect, the method in any one of the fourth aspect or the possible designs of the fourth aspect, the method in any one of the fifth aspect or the possible designs of the fifth aspect, and the method in any one of the sixth aspect or the possible designs of the sixth aspect.

According to a fifteenth aspect, an embodiment of this application further provides a chip system, where the chip system includes a processor, and may further include a memory, to implement the method in any one of the first aspect or the possible designs of the first aspect, the method in any one of the second aspect or the possible designs of the second aspect, the method in any one of the third aspect or the possible designs of the third aspect, the method in any one of the fourth aspect or the possible designs of the fourth aspect, the method in any one of the fifth aspect or the possible designs of the fifth aspect, and the method in any one of the sixth aspect or the possible designs of the sixth aspect. The chip system may include a chip, or may include a chip and another discrete component.

According to a sixteenth aspect, an embodiment of this application further provides a computer program product, including an instruction. When the instruction is run on a computer, the computer is enabled to perform the method in any one of the first aspect or the possible designs of the first aspect, the method in any one of the second aspect or the possible designs of the second aspect, the method in any one of the third aspect or the possible designs of the third aspect, the method in any one of the fourth aspect or the possible designs of the fourth aspect, the method in any one of the fifth aspect or the possible designs of the fifth aspect, and the method in any one of the sixth aspect or the possible designs of the sixth aspect.

DESCRIPTION OF EMBODIMENTS

Figure 1:
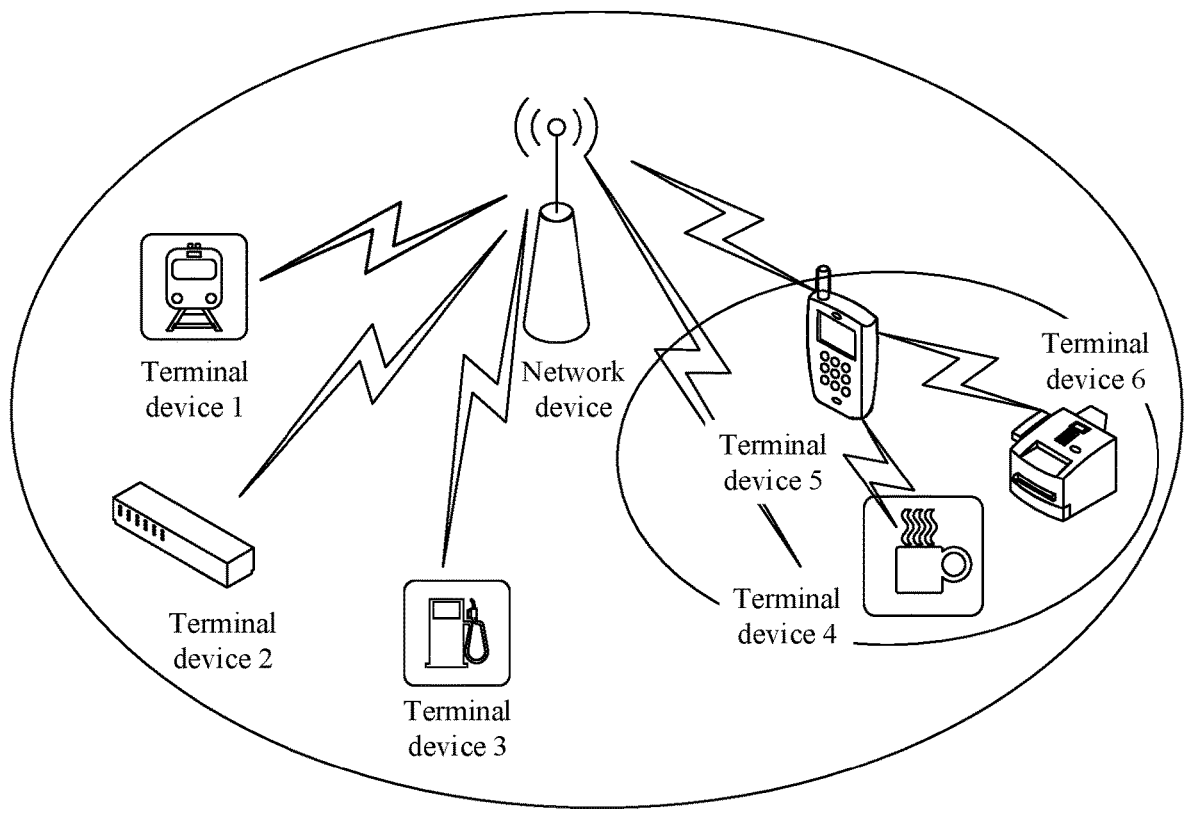
FIG. 1 is a schematic diagram of an applicable communications system according to an embodiment of this application.

To make objectives, technical solutions and advantages of the embodiments of this application clearer, the following further describes the embodiments of this application in detail with reference to the accompanying drawings.

The following describes some terms in the embodiments of this application, to facilitate understanding for a person skilled in the art.

(1) A terminal device includes a device that provides a user with voice and/or data connectivity, for example, may include a handheld device having a wireless connection function, or a processing device connected to a wireless modem. The terminal device may communicate with a core network through a radio access network (RAN), and exchange voice and/or data with the RAN. The terminal device may include user equipment (e.g., terminal device), a wireless terminal device, a mobile terminal device, a subscriber unit, a subscriber station, a mobile station, a mobile console, a remote station, an access point (AP), a remote terminal device, an access terminal device, a user terminal device, a user agent, a user device, or the like. For example, the terminal device may include a mobile phone (which is also referred to as a "cellular" phone), a computer having a mobile terminal device, a portable, pocket-sized, handheld, computer built-in, or in-vehicle mobile apparatus, and a smart wearable device. For example, the terminal device is a device such as a personal communications service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device such as a barcode scanner, a radio frequency identification (RFID) reader, a sensor, a global positioning system (GPS), or a laser scanner.

As an example instead of a limitation, in the embodiments of this application, the terminal device may alternatively be a wearable device. The wearable device may also be referred to as a wearable intelligent device, and is a general term for wearable devices, such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not merely a hardware device, but is used to implement a powerful function through software support, data interaction, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

(2) A network device includes, for example, an access network (AN) device such as a base station (such as an access point), and may be a device that is in an access network and that communicates with a wireless terminal device over an air interface through one or more cells. The network device may be configured to: mutually convert a received over-the-air frame and an internet protocol (IP) packet, and serve as a router between the terminal device and a rest portion of the access network, where the rest portion of the access network may include an IP network. The network device may further coordinate attribute management of the air interface. For example, the network device may include an evolved NodeB (NodeB or eNB or e-NodeB) in a long term evolution (LTE) system or an LTE-advanced (LTE-A) system, may include a next generation NodeB (gNB) in a 5th generation (5G) new radio (NR) system, or may include a centralized unit (CU) and a distributed unit (DU) in a cloud access network (cloud radio access network, CloudRAN) system. This is not limited in the embodiments of this application.

(3) Enhanced mobile broadband (eMBB), massive machine type communication (mMTC), and ultra-reliable and low-latency communication (URLLC) are three typical services of 5G in the future. As one of the three typical services of 5G, URLLC mainly applies to scenarios such as unmanned driving and telemedicine, and these application scenarios pose stricter requirements on reliability and latency.

(4) The terms "system" and "network" may be used interchangeably in the embodiments of this application. "A plurality of" refers to two or more than two. In view of this, "a plurality of" may also be understood as "at least two" in the embodiments of this application. "At least one" may be understood as one or more, for example, one, two, or more. For example, including at least one refers to including one, two, or more, and which one, two, or more is included is not limited. For example, if at least one of A, B, and C is included, A, B, C, A and B, A and C, B and C, or A, B, and C may be included. "and/or" describes an association relationship between associated objects and represents that three relationships may exist. For example, A and/or B may represent three cases: There is only A, there are both A and B, and there is only B. In addition, the character "/" usually indicates an "or" relationship between the associated objects unless otherwise specified.

Unless otherwise specified, ordinal numbers such as "first" and "second" mentioned in the embodiments of this application are used to distinguish between a plurality of objects, and are not used to limit a sequence, a time sequence, priorities, or importance of the plurality of objects.

The embodiments of this application may be applied to various communications systems, for example, may be applied to an NB-IoT system, an IoT system, an MTC system, an eMTC system, an LTE system, an LTE-A system, a new radio (NR) system, or a new communications system emerging in future communications development. The communication method provided in the embodiments of this application may be used provided that an entity in a communications system uses different spreading sequences at different times to achieve an objective of interference randomization.

FIG. 1 shows a communications system to which the embodiments of this application may be applied. The communications system shown in FIG. 1 includes a network device and six terminal devices. Any one of a terminal device 1 to a terminal device 6 may send uplink data to the network device. In addition, the terminal device 4 to the terminal device 6 may form a communications sub-system. The network device may send downlink information to the terminal device 1, the terminal device 2, the terminal device 3, and the terminal device 5. The terminal device 5 may send the downlink information to the terminal device 4 and the terminal device 6 based on a device-to-device (device-to-device, D2D) technology. FIG. 1 is merely a schematic diagram, and a type of a communications system, a quantity of devices included in the communications system, a type of a device included in the communications system, and the like are not limited.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may learn that: With evolution of the network architecture and emergence of new service scenarios, the technical solutions provided in the embodiments of this application are also applicable to similar technical problems.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may learn that: With evolution of the network architecture and emergence of new service scenarios, the technical solutions provided in the embodiments of this application are also applicable to similar technical problems.

The following explains and describes some communication nouns or terms used in this application. The communication nouns or terms are also used as a part of the invention content of this application.

1. Slot: A slot is a time domain unit for data scheduling. In a normal cyclic prefix, one slot includes 14 symbols. In an extended cyclic prefix, one slot includes 12 symbols.
2. Higher layer signaling: Higher layer signaling may be signaling sent by a higher-layer protocol layer. The higher-layer protocol layer is at least one protocol layer above a physical layer. The higher-layer protocol layer may specifically include at least one of the following protocol layers: a medium access control (MAC) layer, a radio link control (RLC) layer, a packet data convergence protocol (PDCP) layer, a radio resource control (RRC) layer, and a non-access stratum (NAS).
3. New DCI format: For example, a new DCI format may be a compact DCI format, that is, a downlink control information (DCI) format with a relatively small quantity of bits, and is a new DCI format that is for scheduling data and that is introduced in NR R16. Because the quantity of bits is configured flexibly, for example, a relatively small quantity of bits may be configured, the new DCI format may be used as a DCI format for scheduling a high-reliability service. A Compact DCI format for scheduling uplink data may be referred to as DCI format 0_2 (or DCI format 0_2), and a Compact DCI format for scheduling downlink data may be referred to as DCI format 1_2 (or DCI format 1_2).
4. Fallback DCI format: A Fallback DCI format is applicable to a DCI format used before RRC establishment or in an RRC reconfiguration process. A Fallback DCI format for scheduling uplink data may be referred to as DCI format 0_0 (or DCI format 0_0). A Fallback DCI format for scheduling downlink data may be referred to as DCI format 1_0 (or DCI format 1_0). Each field in the Fallback DCI format is irrelevant to configuration information to avoid ambiguity in the reconfiguration process.
5. Normal DCI format: A Normal DCI format is a DCI format introduced in NR R15 for data scheduling. A Normal DCI format for scheduling uplink data may be referred to as DCI format 01 (or DCI format 01). A Normal DCI format for scheduling downlink data may be referred to as DCI format 1_1 (or DCI format 1_1).
6. Time domain resource set: A time domain resource set may be a time domain resource set predefined by a protocol, or may be a time domain resource set configured by a higher layer. The time domain resource set may be in a table or another form. For example, a pattern of a time domain resource table (an uplink table and a downlink table are separate) predefined in a protocol is shown in Table 1.

TABLE 1

| Row index (row number) | PUSCH/PDSCH mapping type | K2/K1 | S (symbol) | L (length) |
| --- | --- | --- | --- | --- |
| 1 | Type A | x | x | x |
| 2 | Type A | x | x | x |
| 3 | Type A | x | x | x |
| ... | ... | ... | ... | ... |
| 16 | Type B | x | x | x |

S represents a start symbol of a data channel, and L represents a quantity of symbols occupied by the data channel (a quantity of consecutive symbols starting from S). The parameter K2 (the uplink table includes K2) indicates a quantity of slots between a moment when a PDCCH is received and a moment when a PUSCH is sent. The parameter K0 (the downlink table includes K0) indicates a quantity of slots between a moment when a PDCCH is received and a moment when a PDSCH is sent. The PDSCH/PUSCH mapping type has two candidate values: Type A and Type B. Type A indicates that a location of the first demodulation reference signal (DMRS) is the third symbol or the fourth symbol in a slot. Type B indicates that a location of the first DMRS is the first symbol at the beginning of the data channel.

A pattern of a time domain resource table (an uplink table and a downlink table are separate) configured by a base station for a user by using higher layer signaling (for example, RRC signaling) is shown in Table 2.

TABLE 2

| PUSCH/PDSCH mapping type | K2/K1 | SLIV |
| --- | --- | --- |
| Type A | x | x |
| Type A | x | x |
| Type A | x | x |
| ... | ... | ... |
| Type B | x | x |

The time domain resource table configured as shown in Table 2 has a maximum of 16 rows, and an SLIV in Table 2 is a result obtained by jointly encoding S and L. One SLIV can uniquely determine a group of S and L. For related explanations of the parameter K2 or the parameter K0 and the PUSCH mapping type, refer to the foregoing description.

7. Grant-based (GB) scheduling manner: A GB scheduling manner is a data scheduling method in which a base station sends control information (for example, a PDCCH) to a terminal device, and the PDCCH is used to schedule downlink data (for example, a PDSCH) transmission or schedule uplink data (for example, a PUSCH) transmission. In other words, the PDCCH indicates a time domain resource of the PDSCH or the PUSCH. The following uses PUSCH time domain resource indication as an example to describe a current time domain resource indication process.

Step 1: A base station determines a time domain resource set, where the time domain resource set may be a time domain resource set predefined in a protocol or a time domain resource set configured by a higher layer. (For a specific form of a table predefined in the protocol and a table configured by the higher layer, refer to Table 1 and Table 2.)

For a received PDCCH, the terminal device specifically uses any one of the following rules to determine a time domain resource set corresponding to DCI carried on the PDCCH:

Rule 1: Determine the time domain resource set corresponding to the DCI according to a rule described in the following Table 3, if the DCI carried on the PDCCH is scrambled with a cell radio network temporary identifier (C-RNTI), an MCS-C-RNTI, a temporary cell identity (Temporary Cell Radio Network Temporary Identity, TC-RNTI), or a configured scheduling RNTI (CS-RNTI), the physical downlink control channel (PDCCH) is received in a common search space (CSS), and a control resource set (CORESET) associated with the search space is not CORESET 0 (in this case, the DCI is definitely fallback DCI, because only the fallback DCI can be received in the CSS).

TABLE 3

| Time domain resource set indicated by system information | Time domain resource set specific to a terminal device | Time domain resource set corresponding to DCI |
| --- | --- | --- |
| Not existing | Not existing | Default time domain resource set in a protocol |
| Existing | Not existing | Time domain resource set indicated by the system information |
| Existing or not existing | Existing | Time domain resource set specific to the terminal device |

A meaning of Table 3 is: The terminal device determines whether a network device does not send indication information X, where the indication information may be carried in higher layer signaling, and may be denoted as pusch-TimeDomainAllocationList. The indication information X indicates a time domain resource set specific to a terminal device. When the time domain resource set is the time domain resource set specific to the terminal device, the time domain resource set specific to the terminal device may be used for all DCI of the terminal device.

If the time domain resource set specific to the terminal device is "Existing", that is, the network device sends indication information to indicate that the terminal device has the specific time domain resource set, the time domain resource set specific to the terminal device is the time domain resource set corresponding to the DCI.

If the time domain resource set specific to the terminal device is "Not existing", that is, the network device does not send indication information indicating the time domain resource set specific to the terminal device, the terminal device determines whether there is the time domain resource set indicated by the system information.

Further, if there is the time domain resource set indicated by the system information, that is, the network device sends the time domain resource set indicated by the system information, the time domain resource set indicated by the system information is used as the time domain resource set corresponding to the DCI.

Further, if the system information does not indicate the time domain resource set, the default time domain resource set in the protocol is used as the time domain resource set corresponding to the DCI.

Rule 2: Determine the time domain resource set corresponding to the DCI in the manner described in Table 3, if the DCI carried on the PDCCH is scrambled with a C-RNTI, an MCS-C-RNTI, a TC-RNTI, or a CS-RNTI, and the PDCCH is received in a user-specific search space (terminal device-specific search space, USS) (for example, the DCI may be fallback DCI or normal DCI).

Step 2: The terminal device receives a PDCCH, where the PDCCH carries DCI, and the DCI includes X bits that indicate a row in a determined time domain resource set, to indicate a start symbol S and a length L of a data channel.

If a format of the DCI is fallback DCI, that is, DCI format 1_0 (used for scheduling downlink data) or DCI format 0_0 (used for scheduling uplink data), X is equal to 4 bits. In other words, four bits are used to indicate which row in the time domain resource table corresponds to the time domain resource.

If a format of the DCI is normal DCI, that is, DCI format 1_1 (used for scheduling downlink data) or DCI format 0_1, a quantity X of bits depends on a size of the table. If there are 16 rows in the table, 4 bits are used; or if there are 8 rows in the table, 3 bits are used.

8. Grant free (GF) manner: A grant free manner is a data scheduling method, and may also be referred to as type 1 configured grant or type 1 CG. In this manner, the base station does not send control information, that is, a PDCCH, to a user (which is also referred to as a grant free scheduling manner or a configured scheduling manner), and a location of a time domain resource occupied for data transmission is configured by using higher layer signaling. The following specifically describes a time domain resource indication process in a current GF process.

Step 1: The base station determines a time domain resource set, where the time domain resource table may be a table predefined in a protocol or a table configured by a higher layer (for details about table content, refer to the foregoing description, and details are not described again).

For a specific rule of determining the time domain resource set, refer to the description of "Rule 2" in the foregoing "Grant-based scheduling manner". Details are not described again.

Step 2: The base station sends higher layer signaling to the terminal device, where the higher layer signaling indicates a row in the determined time domain resource set, to indicate a start symbol S and a length L of a data channel.

Figure 2A:
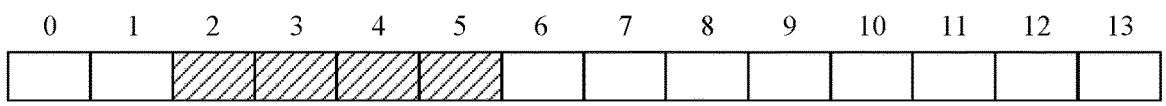
FIG. 2A to FIG. 2C are schematic diagrams of time domain resources according to an embodiment of this application.

According to the foregoing method steps, the user can determine the start symbol and a quantity of symbols of a time domain resource of the data channel. For example, the user may determine that S=2 and L=4. That is, the start symbol of the data channel is symbol 2, and the length is 4, as shown in FIG. 2A.

Figure 2B:
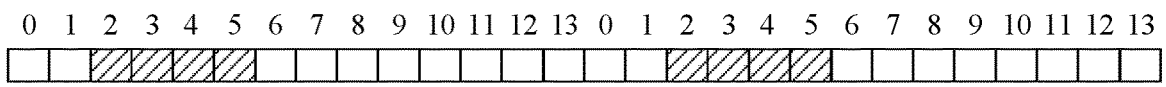

In addition, R15 supports slot-level repetition. Specifically, the base station further configures an aggregation factor (aggregationFactorDL) for the user. The factor is denoted as K, and K represents a quantity of consecutive slots used for data transmission. If the factor is not configured, it is considered that there is no repetition. For example, the user determines that the start symbol of the data channel is symbol 2, the length is 4, and the aggregation factor is 2, which means that data is transmitted in two consecutive slots, a start symbol of data in each slot is 2, and a length of the data in each slot is 4, as shown in FIG. 2B.

In NR R16, that is, in the 16th version, Enhancements of the time domain resource indication include:

Enhancement 1: There are two time domain repetition manners: a mini-slot-based time domain repetition manner and a slot-based time domain repetition manner.

The first type: supporting repetition at a mini-slot level (also referred to as a Rel-16 PUSCH transmission scheme).
  (1) Specifically, the base station indicates one time domain resource, and then indicates a repetition quantity R, that is, R resources are obtained by repeating the first time domain resource for R consecutive times. If a resource crosses a boundary of a slot, the resource is split into two resources.

Figure 2C:
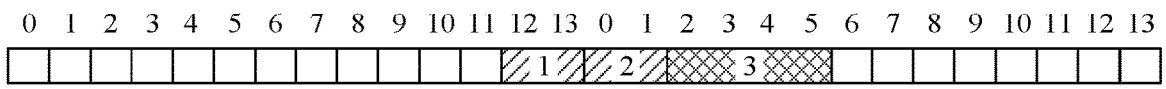

For example, it indicates that a start symbol of a time domain resource is 12, a length is four symbols, and a repetition quantity is 2. In other words, the first resource is symbol 12 to symbol 1 in the second slot, and the second resource is symbol 2 to symbol 5 in the second slot. Because the first resource crosses a slot boundary, the first resource may be split into two resources by using the slot boundary, that is, there are three repetitions, and resources occupied for the three repetitions are shown in FIG. 2C. In this manner, even if data is at a boundary of a slot, data can still be repeated without waiting for a next slot, thereby ensuring a low latency and high reliability.

(2) Because data may start from any symbol, this time domain repetition manner can support only the mapping type B.
  (3) In addition, only normal DCI or compact DCI can be used to schedule the mini-slot-based time domain repetition manner, and fallback DCI cannot be used to schedule the mini-slot-based time domain repetition manner.
  (4) Indication of a repetition quantity: A specific manner of indicating mini-slot repetitions is to add a column to the time domain resource table configured by the higher layer, to indicate the repetition quantity, as shown in Table 4.

TABLE 4

| PUSCH/PDSCH mapping manner | K2/K1 | SLIV or S/L | Repetition quantity R |
|---|---|---|---|
| x | x | x | x |
| x | x | x | x |
| x | x | x | x |
| ... | ... | ... | ... |
| x | x | x | x |

The second type: supporting repetition at a slot level (for example, a Rel-15 PUSCH transmission scheme).

A specific manner of indicating a repetition quantity is to add a column to the table configured by the higher layer, where the column indicates the repetition quantity. Alternatively, the table configured by the higher layer is similar to that in R15, but no column is added. The repetition quantity is indicated by an additional piece of higher layer signaling.

Enhancement 2: For GB scheduling, the base station may configure which time domain repetition manner is used for a DCI format, that is, normal DCI or compact DCI. For example, a slot-based time domain repetition manner is configured for normal DCI, and a mini-slot-based time domain repetition manner is configured for compact DCI. For GF scheduling, a time domain repetition manner is configured at a higher layer.

Based on the foregoing analysis, in the prior art, the base station may configure different time domain resource tables for different DCI formats by using higher layer signaling. It is assumed that the base station configures two time domain resource tables, for example, a time domain resource table corresponding to a normal DCI format and a time domain resource table corresponding to a compact DCI format. In this case, for a GF scheduling scenario, a principle is required by the terminal device and the base station to determine a corresponding time domain resource table in the GF scenario to ensure consistency between the base station and the user.

Figure 3:
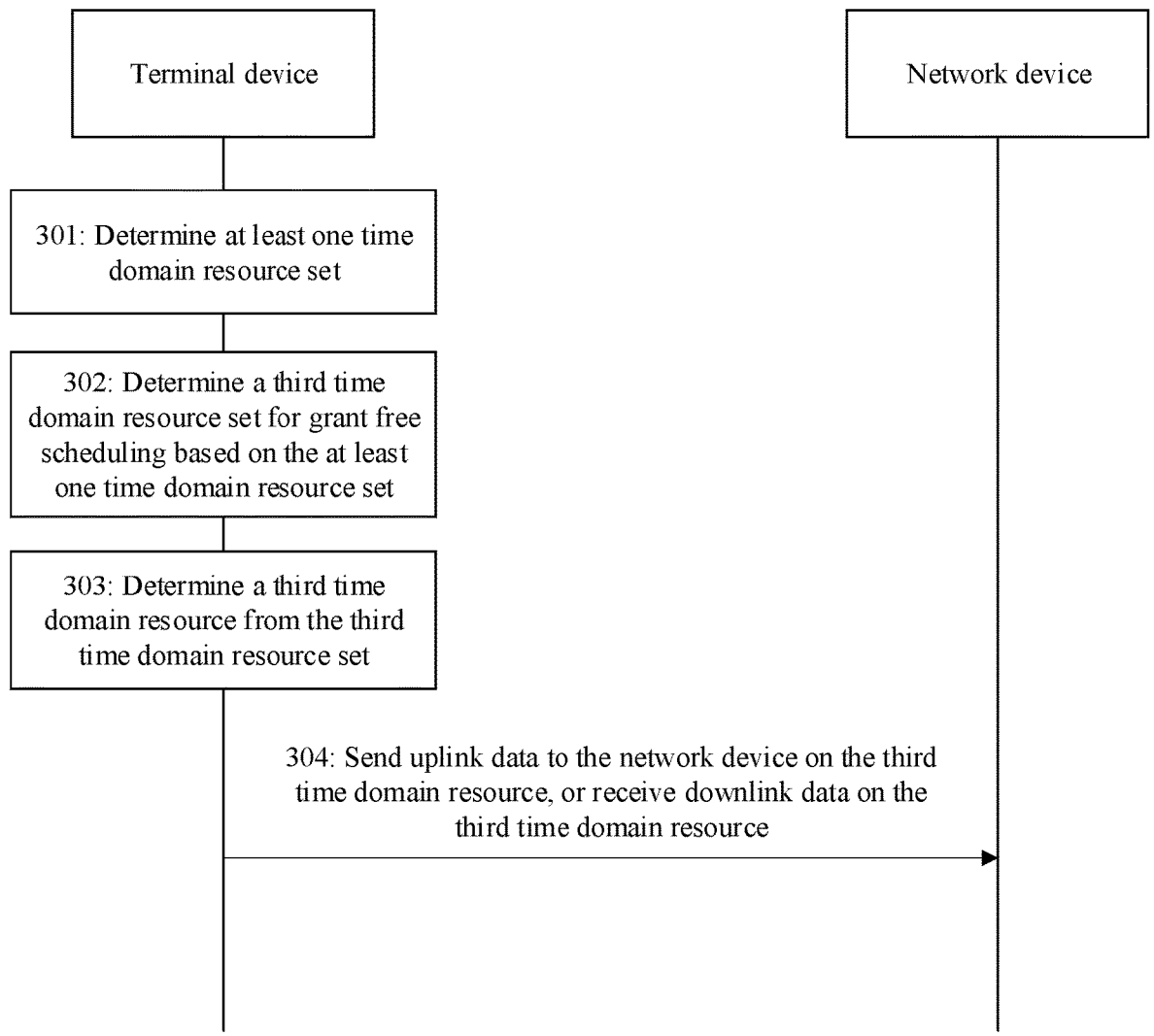
FIG. 3 is a schematic flowchart of a first communication method according to an embodiment of this application.

In view of this, an embodiment of this application provides a schematic flowchart of a first communication method, as shown in FIG. 3. The method is applicable to a GF scheduling scenario, and may be performed by a terminal device. Referring to FIG. 3, the method includes the following steps.

Step 301: The terminal device determines at least one time domain resource set, where each of the at least one time domain resource set corresponds to one DCI format.

The at least one time domain resource set may be configured by using higher layer signaling, or may be predefined in a protocol. The time domain resource set may be, for example, the time domain resource table shown in Table 1, Table 2, or Table 4, or may be in another form. This is not limited in this application.

In a possible embodiment, the at least one time domain resource set may include one time domain resource set, or may include two time domain resource sets, or the at least one time domain resource set includes three or more time domain resource sets. When the at least one time domain resource set includes two time domain resource sets, the two time domain resource sets may include a first time domain resource set corresponding to a first DCI format and a second time domain resource set corresponding to a second DCI format. It should be noted that the first DCI format in the following may be understood as a normal DCI format (or understood as DCI format 0_1 or DCI format 1_1), and the second DCI format may be understood as a Compact DCI format (or understood as DCI format 0_2 or DCI format 1_2). A third DCI format may be understood as a fallback DCI format (or understood as DCI format 0_0 or DCI format 1_0).

Step 302: The terminal device determines a third time domain resource set for grant free scheduling based on the at least one time domain resource set.

Specifically, the terminal device may determine the third time domain resource set for grant free scheduling based on information such as a time domain repetition manner and the DCI format of the at least one time domain resource set according to a pre-agreed rule. For a specific rule, refer to the following.

Step 303: The terminal device determines a third time domain resource from the third time domain resource set.

Step 304: The terminal device sends uplink data to the network device on the third time domain resource, or receives downlink data on the third time domain resource.

The following describes various cases of determining the third time domain resource set in step 302 in the embodiment shown in FIG. 3.

Case 1: The at least one time domain resource set is one time domain resource set, and is the first time domain resource set corresponding to the first DCI format.

The terminal device determines a time domain resource corresponding to the first DCI format in the following manner.

Manner 1: The terminal device receives indication information X from the network device, where the indication information X indicates a time domain resource set specific to the first DCI format, that is, the first time domain resource set. The indication information may be carried in higher layer signaling. For example, the indication information X may be denoted as pusch-TimeDomainAllocationList-ForDCIformat0_1. Because the time domain resource set is specific to the DCI, all time domain resources of data scheduled in the first DCI format are definitely time domain resources in the first time domain resource set.

In a possible embodiment, the terminal device may further receive first indication information from the network device, where the first indication information is used to indicate a time domain repetition manner of grant free scheduling. The terminal device determines the third time domain resource set for grant free scheduling based on the time domain repetition manner of grant free scheduling and the at least one time domain resource set.

Specifically, in a possible embodiment, in addition to sending the first indication information to the terminal device, the network device may send second indication information to the terminal device. The second indication information is used to indicate a time domain repetition manner of the first DCI format, and is used to indicate a time domain repetition manner of the second DCI format. Then, the terminal device determines the third time domain resource set for grant free scheduling based on the time domain repetition manner of grant free scheduling and the at least one time domain resource set. Specifically, the third time domain resource set for grant free scheduling is determined according to the following rules.

Rule 1: If the time domain repetition manner of grant free scheduling is the same as both the time domain repetition manner of the first DCI format and the repetition manner of the second DCI format, but the second DCI format has no specific time domain resource set, it is determined that the at least one time domain resource set is the third time domain resource set for grant free scheduling.

That the second DCI format does not have a specific time domain resource set means that for the second DCI format, the network device does not send indication information Y, to indicate a time domain resource set (that is, the second time domain resource set) specific to the second DCI format. The time domain resource set specific to the second DCI format means that all time domain resources of data scheduled in the second DCI format are definitely resources in the second time domain resource set.

Rule 2: The time domain repetition manner of grant free scheduling, the time domain repetition manner of the first DCI format, and the repetition manner of the second DCI format are all different, and there is no time domain resource set specific to the second DCI format. In this case, it is determined that the at least one time domain resource set is the third time domain resource set for grant free scheduling.

For example, the network device configures a time domain resource table in the normal DCI format for the terminal device by using RRC signaling, and the network device further indicates, to the terminal device, that the time domain repetition manner of grant free scheduling is a slot-based time domain repetition manner. Because the network device indicates, in the second indication information, that the normal DCI format is the slot-based time domain repetition manner and that the Compact DCI format is the slot-based time domain repetition manner, the terminal device may determine that the time domain repetition manner of grant free scheduling is the same as the time domain repetition manners of the normal DCI format and the Compact DCI format. However, because the network device does not configure a time domain resource table corresponding to the Compact DCI format for the terminal device, the terminal device determines that the time domain resource table in the normal DCI format is a time domain resource table that needs to be used.

According to the method in Case 1, a time domain resource set corresponding to a DCI format whose time domain repetition manner is the same as the time domain repetition manner of GF may be determined as the time domain resource set corresponding to GF based on the time domain repetition manner of GF. First, the network device and the terminal device determine the time domain resource set by using the same rule, so that it can be ensured that time domain resource sets determined by the network device and the terminal device are consistent, so as to ensure that a same data resource is determined, and ensure normal communication. Second, because time domain resources in time domain resource sets corresponding to different time domain repetition manners have different features, selecting time domain resource sets with a same repetition manner can ensure the time domain repetition manner and ensure that all time domain resources in the time domain resource sets can conform to a feature of the time domain repetition manner, thereby ensuring normal communication.

It should be noted that the foregoing description is provided by using an example in which the at least one time domain resource set is one time domain resource set, and is the first time domain resource set corresponding to the first DCI format, and there is no time domain resource set specific to the second DCI format. When the at least one time domain resource set is one time domain resource set, and is the second time domain resource set corresponding to the second DCI format, and there is no time domain resource set specific to the first DCI format, the method is completely the same, and details are not described again.

Case 2: When the at least one time domain resource set includes two time domain resource sets, the two time domain resource sets may include the first time domain resource set corresponding to the first DCI format and the second time domain resource set corresponding to the second DCI format.

A process in which the terminal device determines the first time domain resource set corresponding to the first DCI format and the time domain resource set corresponding to the second DCI format may be implemented by using the method in Manner 1 of Case 1, or by using any one of the following manners.

Manner 2: First, a time domain resource set corresponding to a specific DCI format is determined according to Manner 1. If it is found that the DCI format does not have a specific time domain resource set, the time domain resource set corresponding to the DCI format may be determined in the manner shown in Table 3.

Manner 3: The time domain resource set corresponding to the DCI format may be determined in the manner shown in Table 3, that is, the time domain resource set specific to the terminal device in Table 3 is changed to the time domain resource set specific to the DCI format.

Case 2 further includes the following Case 2.1 to Case 2.3.

Case 2.1: The terminal device selects, from the at least one time domain resource set, the second time domain resource set corresponding to the second DCI format as the third time domain resource set.

For example, the network device configures a time domain resource set in the normal DCI format and a time domain resource set in the Compact DCI format for the terminal device by using RRC signaling, or determines a time domain resource set in the normal DCI format and a time domain resource set in the Compact DCI format according to the foregoing Manner 1, Manner 2, or Manner 3. In this case, the terminal device determines that the time domain resource set in the Compact DCI format is the time domain resource set that needs to be used.

Alternatively, the terminal device selects, from the at least one time domain resource set, the first time domain resource set corresponding to the first DCI format as the third time domain resource set.

For example, the network device configures a time domain resource set in the normal DCI format and a time domain resource set in the Compact DCI format for the terminal device by using RRC signaling. In this case, the terminal device determines the time domain resource set in the normal DCI format as the time domain resource set that needs to be used.

According to the method described in Case 2.1, it is specified that the time domain resource set of GF is a time domain resource set corresponding to a DCI format (the first DCI format or the second DCI format). The network device and the terminal device determine the time domain resource set by using a same rule, so that it can be ensured that time domain resource sets determined by the network device and the terminal device are consistent, so as to ensure that a same data time domain resource is determined, and ensure communication reliability.

Case 2.2: In a possible embodiment, the terminal device may further receive third indication information from the network device, where the third indication information is used to indicate that one of the two time domain resource sets is the third time domain resource set.

Specifically, in a case, the first indication information may indicate that the first time domain resource set is used as the third time domain resource set. After receiving the third indication information, the terminal device may use the first time domain resource set as the third time domain resource set based on the third indication information. In another case, the first indication information may indicate that the second time domain resource set is used as the third time domain resource set. After receiving the third indication information, the terminal device may use the second time domain resource set as the third time domain resource set based on the third indication information.

For example, the network device configures a time domain resource set in the normal DCI format and a time domain resource set in the Compact DCI format for the terminal device by using RRC signaling, or determines a time domain resource set in the normal DCI format and a time domain resource set in the Compact DCI format according to the foregoing Manner 1, Manner 2, or Manner 3. The network device further indicates, to the terminal device, that the time domain resource set in the Compact DCI format is the time domain resource set that the terminal needs to use. In this case, the terminal device determines that the time domain resource set in the Compact DCI format is the time domain resource set that needs to be used.

According to the method described in Case 2.2, the higher layer signaling is used to indicate a time domain resource set corresponding to a DCI format (the first DCI format or the second DCI format) for GF, and the network device and the terminal device determine the time domain resource set by using a same rule, so that it can be ensured that time domain resource sets determined by the network device and the terminal device are consistent, so as to ensure that a same data time domain resource is determined, and ensure communication reliability. In addition, because the time domain resource set corresponding to GF is configured by the network device, it can be ensured that the configured time domain resource set meets a service requirement of GF as much as possible, and resource scheduling flexibility and reliability are ensured.

Optionally, in case 2.2, if the terminal device does not receive the first indication information, that is, the network device does not send the first indication information, the third time domain resource set may be determined in the manner shown in Table 3, or a time domain resource set corresponding to the first DCI format may be used, or a time domain resource set corresponding to the second DCI format may be used. According to this method, when the network device does not indicate the third time domain resource set, the network device and the terminal device determine the time domain resource set by using a same rule, so that it can be ensured that time domain resource sets determined by the network device and the terminal device are consistent, so as to ensure that a same data time domain resource is determined, and ensure communication reliability.

Case 2.3: In addition to sending the first indication information to the terminal device, the network device may further send the second indication information to the terminal device. The second indication information is used to indicate a time domain repetition manner of the first DCI format, and is used to indicate a time domain repetition manner of the second DCI format. The terminal device determines the third time domain resource set based on the time domain repetition manner of grant free scheduling, the time domain repetition manner of the first DCI format, and/or the time domain repetition manner of the second DCI format.

Manner 3: The terminal device determines, as the third time domain resource set from the first time domain resource set and the second time domain resource set, a time domain resource set corresponding to a DCI format whose time domain repetition manner is the same as the time domain repetition manner of grant free scheduling. In other words, when determining that the time domain repetition manner of the first DCI format is the same as the time domain repetition manner of grant free scheduling, the terminal device uses the first time domain resource set as the third time domain resource set; or when determining that the time domain repetition manner of the second DCI format is the same as the time domain repetition manner of grant free scheduling, the terminal device uses the second time domain resource set as the third time domain resource set.

For example, the network device configures the time domain repetition manner of grant free scheduling as a slot-based time domain repetition manner for the terminal device by using RRC signaling. The network device configures, for the terminal device by using RRC signaling, the time domain resource set corresponding to the normal DCI format and the time domain resource set corresponding to the Compact DCI format, or determines the time domain resource set corresponding to the normal DCI format and the time domain resource set corresponding to the Compact DCI format according to Manner 1, Manner 2, or Manner 3. The network device further indicates, to the terminal device, that the normal DCI format is a slot-based time domain repetition manner and that the Compact DCI format is a mini-slot-based time domain repetition manner. Therefore, the terminal device can determine that the time domain repetition manner of grant free scheduling is the same as the time domain repetition manner of the normal DCI format, and the terminal device determines that the time domain resource table corresponding to the normal DCI format is a time domain resource table that needs to be used.

According to the method in Manner 3, a time domain resource set corresponding to a DCI format whose time domain repetition manner is the same as the time domain repetition manner of GF may be determined as a time domain resource set corresponding to GF based on the time domain repetition manner of GF. First, the network device and the terminal device determine the time domain resource set by using a same rule, so that it can be ensured that time domain resource sets determined by the network device and the terminal device are consistent, thereby ensuring communication reliability. Second, because time domain resources in time domain resource sets corresponding to different time domain repetition manners have different features, selecting time domain resource sets with a same repetition manner can ensure that all time domain resources in the time domain resource sets can conform to the time domain repetition manner, thereby ensuring normal communication.

Manner 4: The terminal device determines, as the third time domain resource set from the first time domain resource set and the second time domain resource set, a time domain resource set corresponding to a DCI format whose time domain repetition manner is the same as the time domain repetition manner of grant free scheduling. When both the time domain repetition manner of the first DCI format and the time domain repetition manner of the second DCI format are the same as the time domain repetition manner of grant free scheduling, the terminal device determines the second time domain resource set as the third time domain resource set, or the terminal device determines the first time domain resource set as the third time domain resource set. In other words, the terminal device determines the time domain resource set corresponding to the second DCI format as the third time domain resource set, or the terminal device determines the time domain resource set corresponding to the first DCI format as the third time domain resource set, or the terminal device determines the third time domain resource set in a manner shown in Table 3.

For example, the network device configures the time domain repetition manner of grant free scheduling as a slot-based time domain repetition manner for the terminal device by using RRC signaling. The network device configures, for the terminal device by using RRC signaling, the time domain resource set corresponding to the normal DCI format and the time domain resource set corresponding to the Compact DCI format, or determines the time domain resource set corresponding to the normal DCI format and the time domain resource set corresponding to the Compact DCI format according to Manner 1, Manner 2, or Manner 3. The network device further indicates, to the terminal device, that the normal DCI format is a slot-based time domain repetition manner and that the Compact DCI format is a slot-based time domain repetition manner. Therefore, the terminal device can determine that the time domain repetition manner of grant free scheduling is the same as both the time domain repetition manner of the normal DCI format and the time domain resource set of the Compact DCI format, and the terminal device determines that the time domain resource set corresponding to the normal DCI format is a time domain resource set that needs to be used, or the terminal device determines that the time domain resource set corresponding to the Compact DCI format is a time domain resource set that needs to be used.

According to the method in Manner 4, a time domain resource set corresponding to a DCI format whose time domain repetition manner is the same as the time domain repetition manner of GF may be determined as a time domain resource set corresponding to GF based on the time domain repetition manner of GF. First, the network device and the terminal device determine the time domain resource set by using a same rule, so that it can be ensured that time domain resource sets determined by the network device and the terminal device are consistent, so as to ensure that a same data resource is determined, and ensure communication reliability. Second, because time domain resources in time domain resource sets corresponding to different time domain repetition manners have different features, selecting time domain resource sets with a same repetition manner can ensure that all time domain resources in the time domain resource sets can conform to the time domain repetition manner, thereby ensuring normal communication. In addition, when a plurality of time domain resource sets can conform to a feature of the time domain repetition manner, it is specified that one of the DCI formats or one of the time domain resource sets is a finally used time domain resource set, so that it is ensured that the network device and the terminal device determine a same time domain resource set, and communication reliability is ensured.

Manner 5: The terminal device determines, as the third time domain resource set from the first time domain resource set and the second time domain resource set, a time domain resource set corresponding to a DCI format whose time domain repetition manner is the same as the time domain repetition manner of grant free scheduling. When both the time domain repetition manner of the first DCI format and the time domain repetition manner of the second DCI format are different from the time domain repetition manner of grant free scheduling, the terminal device determines the second time domain resource set as the third time domain resource set, or the terminal device determines the first time domain resource set as the third time domain resource set. Alternatively, the third time domain resource set may be determined in the manner shown in Table 3.

For example, the network device configures the time domain repetition manner of grant free scheduling as a slot-based time domain repetition manner for the terminal device by using RRC signaling. The network device configures, for the terminal device by using RRC signaling, the time domain resource table of the normal DCI format and the time domain resource table of the Compact DCI format. The network device further indicates, to the terminal device, that the normal DCI format is a mini-slot-based time domain repetition manner and that the Compact DCI format is a mini-slot-based time domain repetition manner. Therefore, the terminal device can determine that the time domain repetition manner of grant free scheduling is different from both the time domain repetition manner of the normal DCI format and the time domain resource set of the Compact DCI format, and the terminal device determines that the time domain resource set corresponding to the normal DCI format is a time domain resource set that needs to be used, or the terminal device determines that the time domain resource set corresponding to the Compact DCI format is a time domain resource set that needs to be used.

According to the method in Manner 5, a time domain resource set corresponding to a DCI format whose time domain repetition manner is the same as the time domain repetition manner of GF may be determined as a time domain resource set corresponding to GF based on the time domain repetition manner of GF. First, the network device and the terminal device determine the time domain resource set by using a same rule, so that it can be ensured that time domain resource sets determined by the network device and the terminal device are consistent, so as to ensure that a same data resource is determined, and ensure communication reliability. Second, because time domain resources in time domain resource sets corresponding to different time domain repetition manners have different features, selecting time domain resource sets with a same repetition manner can ensure that all time domain resources in the time domain resource sets can conform to a feature of the time domain repetition manner, thereby ensuring normal communication. In addition, when a plurality of time domain resource sets can conform to the feature of the time domain repetition manner, it is specified that one of the DCI formats or one of the time domain resource sets is a finally used time domain resource set, so that it is ensured that the network device and the terminal device determine a same time domain resource set, and communication reliability is ensured.

Manner 6: The terminal device determines, as the third time domain resource set from the first time domain resource set and the second time domain resource set, a time domain resource set corresponding to a DCI format whose time domain repetition manner is the same as the time domain repetition manner of grant free scheduling. When both the time domain repetition manner of the first DCI format and the time domain repetition manner of the second DCI format are different from the time domain repetition manner of grant free scheduling, the terminal device determines the third time domain resource set in the manner shown in Table 3. The default time domain resource set in the protocol, namely a fourth time domain resource set, is determined as the third time domain resource set. Alternatively, the time domain resource set specific to the terminal device, namely a fourth time domain resource set, is used as the third time domain resource set. Alternatively, the time domain resource set indicated by the system information, namely a fourth time domain resource set, is used as the third time domain resource set.

For example, the network device configures the time domain repetition manner of grant free scheduling as a slot-based time domain repetition manner for the terminal device by using RRC signaling, and the network device configures a time domain resource table of the normal DCI format and a time domain resource table of the Compact DCI format for the terminal device by using RRC signaling. The network device further indicates, to the terminal device, that the normal DCI format is a mini-slot-based time domain repetition manner and that the Compact DCI format is a mini-slot-based time domain repetition manner. Therefore, the terminal device can determine that the time domain repetition manner of grant free scheduling is different from both the time domain repetition manner of the normal DCI format and the time domain repetition manner of the Compact DCI format. Therefore, the terminal device determines the default time domain resource table in the protocol, namely the fourth time domain resource set, as the third time domain resource set. Alternatively, the time domain resource set specific to the terminal device, namely the fourth time domain resource set, is used as the third time domain resource set. Alternatively, the time domain resource set indicated by the system information, namely the fourth time domain resource set, is used as the third time domain resource set.

According to the method in Manner 6, a time domain resource set corresponding to a DCI format whose time domain repetition manner is the same as the time domain repetition manner of GF may be determined as a time domain resource set corresponding to GF based on the time domain repetition manner of GF. First, the network device and the terminal device determine the time domain resource set by using a same rule, so that it can be ensured that time domain resource sets determined by the network device and the terminal device are consistent, so as to ensure that a same data resource is determined, and ensure communication reliability. Second, because time domain resources in time domain resource sets corresponding to different time domain repetition manners have different features, selecting time domain resource sets with a same repetition manner can ensure the time domain repetition manner and ensure that all time domain resources in the time domain resource sets can conform to a feature of the time domain repetition manner, thereby ensuring normal communication. In addition, when a plurality of time domain resource sets cannot conform to the feature of the time domain repetition manner, a time domain resource set is determined as a finally used time domain resource set in a manner in the prior art, so that implementation complexity is reduced, it is ensured that the network device and the terminal device determine a same time domain resource set, and communication reliability is ensured.

In a possible embodiment, step 302 and step 303 in FIG. 3 may be replaced with the following: The terminal device receives indication information, and the indication information directly indicates a start symbol and a length of the third time domain resource for grant free scheduling, that is, the third time domain resource is directly determined.

Figure 4:
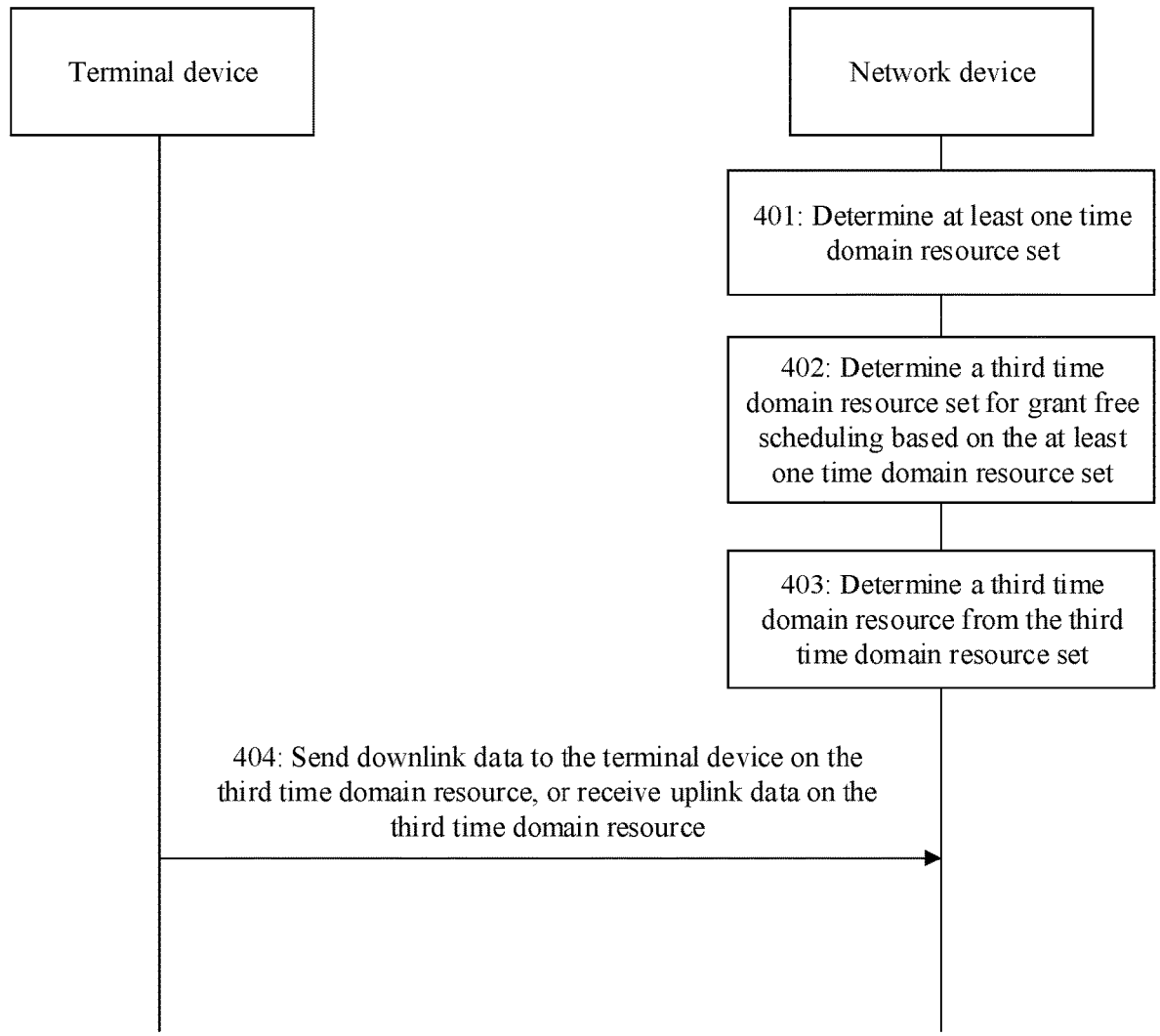
FIG. 4 is a schematic flowchart of a second communication method according to an embodiment of this application.

As shown in FIG. 4, an embodiment of this application provides a schematic flowchart of a second communication method. The method is applicable to a GF scheduling scenario, and may be performed by a network device. Referring to FIG. 4, the method includes the following steps.

Step 401: The network device determines at least one time domain resource set, where each of the at least one time domain resource set corresponds to one DCI format.

The at least one time domain resource set may be configured by using higher layer signaling, or may be predefined in a protocol. The time domain resource set may be, for example, the time domain resource table shown in Table 1, Table 2, or Table 4, or may be in another form. This is not limited in this application.

In a possible embodiment, the at least one time domain resource set may include one time domain resource set, or may include two time domain resource sets, or the at least one time domain resource set includes three or more time domain resource sets. When the at least one time domain resource set includes two time domain resource sets, the two time domain resource sets may include a first time domain resource set corresponding to a first DCI format and a second time domain resource set corresponding to a second DCI format. It should be noted that the first DCI format in the following may be understood as a normal DCI format (or understood as DCI format 0_1 or DCI format 1_1), and the second DCI format may be understood as a Compact DCI format (or understood as DCI format 0_2 or DCI format 1_2). A third DCI format may be understood as a fallback DCI format (or understood as DCI format 0_0 or DCI format 1_0).

Step 402: The network device determines a third time domain resource set for grant free scheduling based on the at least one time domain resource set.

Specifically, the network device may determine the third time domain resource set for grant free scheduling based on information such as a time domain repetition manner and the DCI format of the at least one time domain resource set according to a pre-agreed rule. For a specific rule, refer to the following.

Step 403: The network device determines a third time domain resource from the third time domain resource set.

Step 404: The network device sends downlink data to the terminal device on the third time domain resource, or receives uplink data on the third time domain resource.

For various cases of determining the third time domain resource set in step 402 in the embodiment shown in FIG. 4, refer to the description of the various cases of determining the third time domain resource set in the embodiment corresponding to FIG. 3. Details are not described herein again.

In this embodiment of this application, the network device and the terminal device determine the time domain resource set by using a same rule, so that it can be ensured that time domain resource sets determined by the network device and the terminal device are consistent, thereby ensuring that a same data resource is determined and ensuring normal communication. In addition, because time domain resources in time domain resource sets corresponding to different time domain repetition manners have different features, selecting time domain resource sets with a same repetition manner can ensure the time domain repetition manner and ensure that all time domain resources in the time domain resource sets can conform to a feature of the time domain repetition manner, thereby ensuring normal communication.

Figure 5:
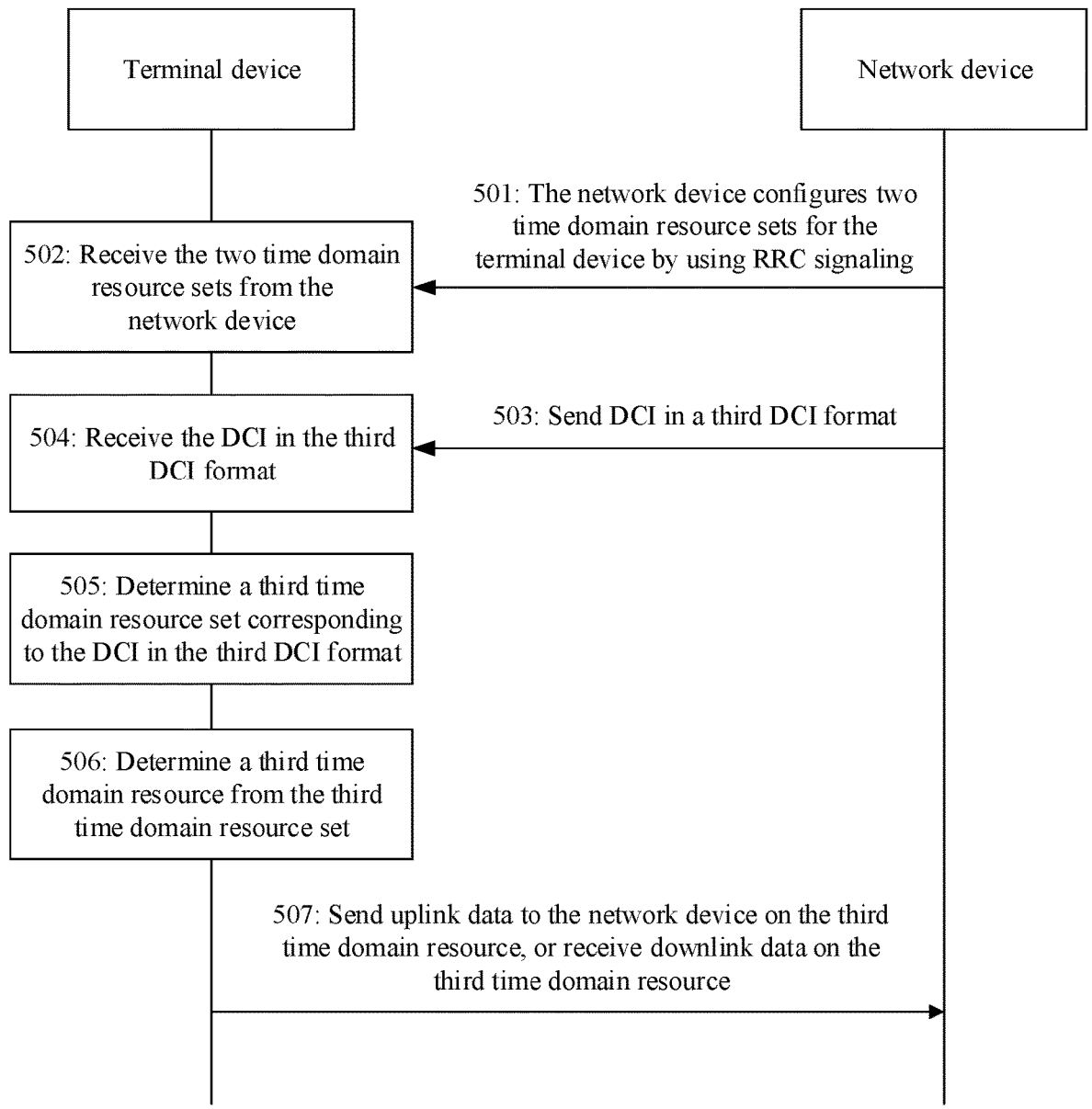
FIG. 5 is a schematic flowchart of a third communication method according to an embodiment of this application.

As shown in FIG. 5, an embodiment of this application provides a schematic flowchart of a third communication method. The method is applicable to a GB scheduling scenario, and may be performed by a terminal device. Referring to FIG. 5, the method includes the following steps.

Step 501: A network device configures two time domain resource sets for the terminal device by using RRC signaling.

Step 502: The terminal device receives the two time domain resource sets from the network device.

For example, the network device configures the two time domain resource sets for the terminal device by using RRC signaling. The two time domain resource sets are respectively a first time domain resource set of a normal DCI format and a second time domain resource set of a Compact DCI format. Alternatively, the first time domain resource set of the normal DCI format and the second time domain resource set of the Compact DCI format may be determined according to the foregoing Manner 1, Manner 2, or Manner 3.

Step 503: The network device sends DCI in a third DCI format to the terminal device.

Specifically, the network device schedules uplink and/or downlink data by using DCI carried on a physical downlink control channel (PDCCH). In this case, a time domain location of a transmission resource used to transmit the uplink and/or downlink data is determined based on a time domain location of the PDCCH and time domain information indicated in the DCI.

Step 504: The terminal device receives the DCI in the third DCI format from the network device.

For example, the network device sends DCI in a fallback DCI format to the terminal device.

Step 505: The terminal device determines a third time domain resource set corresponding to the DCI in the third DCI format, where the third time domain resource set is one of the two time domain sets.

Specifically, the terminal device may determine the third time domain resource set based on information such as time domain repetition manners and DCI formats of the two time domain resource sets according to a pre-agreed rule. For a specific rule, refer to the following.

Step 506: The terminal device determines a third time domain resource from the third time domain resource set.

Step 507: The terminal device sends uplink data on the third time domain resource, or receives downlink data on the third time domain resource.

The following describes various cases of determining the third time domain resource set in step 505 in the embodiment shown in FIG. 5.

Case 3: In addition to receiving the DCI, the terminal device receives sixth indication information, where the sixth indication information is used to indicate a time domain repetition manner of a first DCI format and a time domain repetition manner of a second DCI format. The terminal device may determine the third time domain resource set in any one or more of the following manners based on the time domain repetition manners of the DCI formats.

Manner 7: The terminal device determines, as the third time domain resource set, a time domain resource set corresponding to a mini-slot-level repetition manner. Further, the terminal device may determine a time domain resource from a time domain resource set corresponding to the mini-slot-level repetition manner.

Optionally, if the time domain resource set corresponding to the mini-slot-level repetition manner includes a cross-boundary time domain resource, a non-cross-boundary resource is selected from the time domain resource set.

For example, the network device configures the two time domain resource sets for the terminal device by using RRC signaling. The two time domain resource sets are respectively a first time domain resource set of a normal DCI format and a second time domain resource set of a Compact DCI format. Alternatively, the terminal device may determine the first time domain resource set of the normal DCI format and the second time domain resource set of the Compact DCI format according to the foregoing Manner 1, Manner 2, or Manner 3. The network device indicates, to the terminal device, that the normal DCI format is a slot-based time domain repetition manner and the Compact DCI format is a mini-slot-based time domain repetition manner. The terminal device may determine that the second time domain resource set corresponding to the mini-slot-based time domain repetition manner is a time domain resource set (namely, the third time domain resource set) that needs to be used.

According to the method in Manner 7, a time domain resource set corresponding to a DCI format whose time domain repetition manner is mini-slot-level repetition is determined as a time domain resource set corresponding to the fallback DCI, and only a set that does not cross a boundary is selected from the time domain resource set. The network device and the terminal device determine the time domain resource set by using the same rule, so that it can be ensured that time domain resource sets determined by the network device and the terminal device are consistent, so as to ensure that a same data resource is determined, and ensure normal communication and communication reliability. In addition, because time domain resources in time domain resource sets corresponding to different time domain repetition manners have different features, a time domain resource set corresponding to rows that do not cross a boundary is selected as the time domain resource set corresponding to the fallback DCI. Therefore, it can be ensured that all time domain resources in the time domain resource sets corresponding to the time domain repetition manner can conform to a non-cross-boundary feature, and normal communication is ensured.

Manner 8: The terminal device determines, as the third time domain resource set, a time domain resource set corresponding to a slot-level repetition manner.

For example, the network device configures the two time domain resource sets for the terminal device by using RRC signaling. The two time domain resource sets are respectively a first time domain resource set of a normal DCI format and a second time domain resource set of a Compact DCI format. Alternatively, the terminal device may determine the first time domain resource set of the normal DCI format and the second time domain resource set of the Compact DCI format according to the foregoing Manner 1, Manner 2, or Manner 3. The network device indicates, to the terminal device, that the normal DCI format is a slot-based time domain repetition manner and the Compact DCI format is a mini-slot-based time domain repetition manner. In this case, the terminal device may determine that the first time domain resource table corresponding to the slot-based time domain repetition manner is a time domain resource table (namely, the third time domain resource set) that needs to be used.

According to the method in Manner 8, a time domain resource set corresponding to a DCI format whose time domain repetition manner is slot-level repetition is determined as a time domain resource set corresponding to the fallback DCI. The network device and the terminal device determine the time domain resource set by using the same rule, so that it can be ensured that time domain resource sets determined by the network device and the terminal device are consistent, so as to ensure that a same data resource is determined, and ensure normal communication and communication reliability. In addition, because time domain resources in time domain resource sets corresponding to different time domain repetition manners have different features, selecting the time domain resource set corresponding to the DCI format whose time domain repetition manner is slot-level repetition as the time domain resource set corresponding to the fallback DCI can ensure that all time domain resources in the time domain resource sets corresponding to the time domain repetition manner can conform to a non-cross-boundary feature, and normal communication is ensured.

Manner 9: The terminal device determines that a time domain resource set corresponding to a mini-slot-level repetition manner is the third time domain resource set. If there is no time domain resource set corresponding to the mini-slot-level repetition manner, the terminal device determines that a time domain resource set predefined in a protocol is the third time domain resource set. For example, if there is no DCI format with slot-level repetition, that is, none of DCI formats are configured as mini-slot-level repetition, the time domain resource set may be determined according to the method described in Table 3.

Manner 10: The terminal device determines that a time domain resource set corresponding to a slot-level repetition manner is the third time domain resource set. If there is no time domain resource set corresponding to the slot-level repetition manner, the terminal device determines that a time domain resource set predefined in a protocol is the third time domain resource set. For example, if there is no DCI format with slot-level repetition, that is, none of DCI formats are configured as mini-slot-level repetition, the time domain resource set may be determined according to the method described in Table 3.

It should be noted that the terminal device may determine the third time domain resource set in the foregoing plurality of manners. For example, the terminal device first determines the time domain resource set according to Manner 7, and if the terminal device fails to determine the time domain resource set according to Manner 7, the terminal device determines the time domain resource set according to Manner 8.

Case 4: In a possible embodiment, the terminal device receives seventh indication information, where the seventh indication information may indicate a time domain resource set of the third DCI format. For example, the seventh indication information may indicate a specific time domain resource set, or may indicate a specific time domain resource set in the two time domain resource sets. The terminal device determines the third time domain resource set based on the seventh indication information.

For example, the network device configures the two time domain resource sets for the terminal device by using RRC signaling. The two time domain resource sets are respectively a first time domain resource set of a normal DCI format and a second time domain resource set of a Compact DCI format. Alternatively, the terminal device may determine the first time domain resource set of the normal DCI format and the second time domain resource set of the Compact DCI format according to the foregoing Manner 1, Manner 2, or Manner 3. The network device sends the seventh indication information to the terminal device by using RRC signaling, where the seventh indication information is used to indicate that the first time domain resource set of the normal DCI format is a time domain resource set that needs to be used by the terminal device. Therefore, after receiving the seventh indication information, the terminal device determines the first time domain resource set of the normal DCI format as the time domain resource set that needs to be used by the terminal device, and then receives and sends data on a time domain resource in the time domain resource set.

According to the method described in Case 4, the higher layer signaling is used to indicate a time domain resource set corresponding to a DCI format (the first DCI format or the second DCI format) for the fallback DCI, and the network device and the terminal device determine the time domain resource set by using a same rule, so that it can be ensured that time domain resource sets determined by the network device and the terminal device are consistent, so as to ensure that a same data time domain resource is determined, and ensure communication reliability. In addition, because the time domain resource set corresponding to the fallback DCI is configured by the network device, it can be ensured that the configured time domain resource set meets a requirement of the fallback DCI as much as possible, and resource scheduling flexibility and reliability are ensured.

Case 5: The terminal device does not select the time domain resource set from the two time domain resource sets configured by the network device, but uses a time domain resource set predefined in a protocol as the third time domain resource set, or determines the third time domain resource set according to the method described in Table 3.

In a possible embodiment, step 503 and step 504 in FIG. 5 may be replaced with the following: The terminal device determines a start symbol and a length of a resource in the third time domain resource set corresponding to the DCI in the third DCI format, that is, directly determines the third time domain resource.

Figure 6:
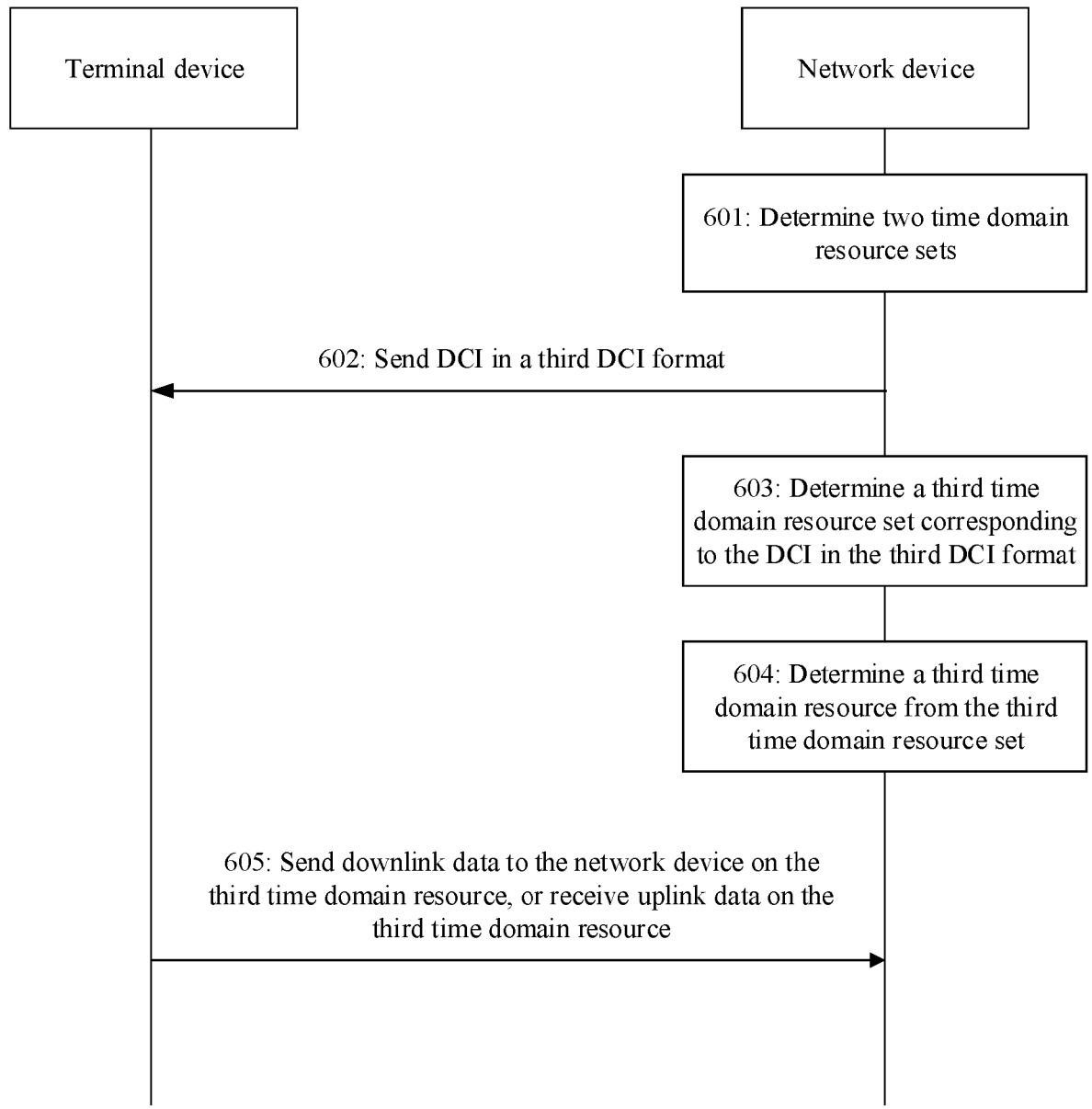
FIG. 6 is a schematic flowchart of a fourth communication method according to an embodiment of this application.

As shown in FIG. 6, an embodiment of this application provides a schematic flowchart of a fourth communication method. The method is applicable to a GF scheduling scenario, and may be performed by a network device. Referring to FIG. 6, the method includes the following steps.

Step 601: The network device determines two time domain resource sets.

The two time domain resource sets include a first time domain resource set in a first DCI format and a second time domain resource set in a second DCI format.

For example, the network device configures the two time domain resource sets for the terminal device by using RRC signaling. The two time domain resource sets are respectively a first time domain resource set of a normal DCI format and a second time domain resource set of a Compact DCI format. Alternatively, the first time domain resource set of the normal DCI format and the second time domain resource set of the Compact DCI format may be determined according to the foregoing Manner 1, Manner 2, or Manner 3.

Step 602: The network device sends DCI in a third DCI format to the terminal device.

For example, the network device sends a time domain resource table in a fallback DCI format to the terminal device.

Step 603: The terminal device determines a third time domain resource set corresponding to the DCI in the third DCI format, where the third time domain resource set is one of the two time domain sets.

Specifically, the network device may determine the third time domain resource set based on information such as time domain repetition manners and DCI formats of the two time domain resource sets according to a pre-agreed rule. For a specific rule, refer to the following.

Step 604: The network device determines a third time domain resource from the third time domain resource set.

Step 605: The network device sends downlink data on the third time domain resource, or receives uplink data on the third time domain resource.

For various cases of determining the third time domain resource set in step 603 in the embodiment shown in FIG. 6, refer to the description of the various cases of determining the third time domain resource set in the embodiment corresponding to FIG. 5. Details are not described herein again.

In this embodiment of this application, the network device and the terminal device determine the time domain resource set by using a same rule, so that it can be ensured that time domain resource sets determined by the network device and the terminal device are consistent, thereby ensuring that a same data resource is determined and ensuring normal communication. In addition, because time domain resources in time domain resource sets corresponding to different time domain repetition manners have different features, selecting time domain resource sets with a same repetition manner can ensure the time domain repetition manner and ensure that all time domain resources in the time domain resource sets can conform to a feature of the time domain repetition manner, thereby ensuring normal communication.

It can be learned from a current related technology in R16 that the normal DCI format or the compact DCI format may be configured as a slot-level time domain repetition manner, or may be configured as a mini-slot-level time domain repetition manner. Different time domain repetition mechanisms have different features. For example, (1) for mini-slot repetition, the indicated time domain resource may cross a slot boundary, and for slot repetition, the indicated time domain resource cannot cross a slot boundary; (2) for mini-slot repetition, only mapping type B is supported, and for slot repetition, type A and type B are supported; (3) for mini-slot repetition, a repetition quantity can only be added to a column in the time domain resource table, and for slot repetition, a column may be added to the time domain resource table, or the repetition quantity is directly supported through higher-layer configuration without adding a column.

Figure 7:
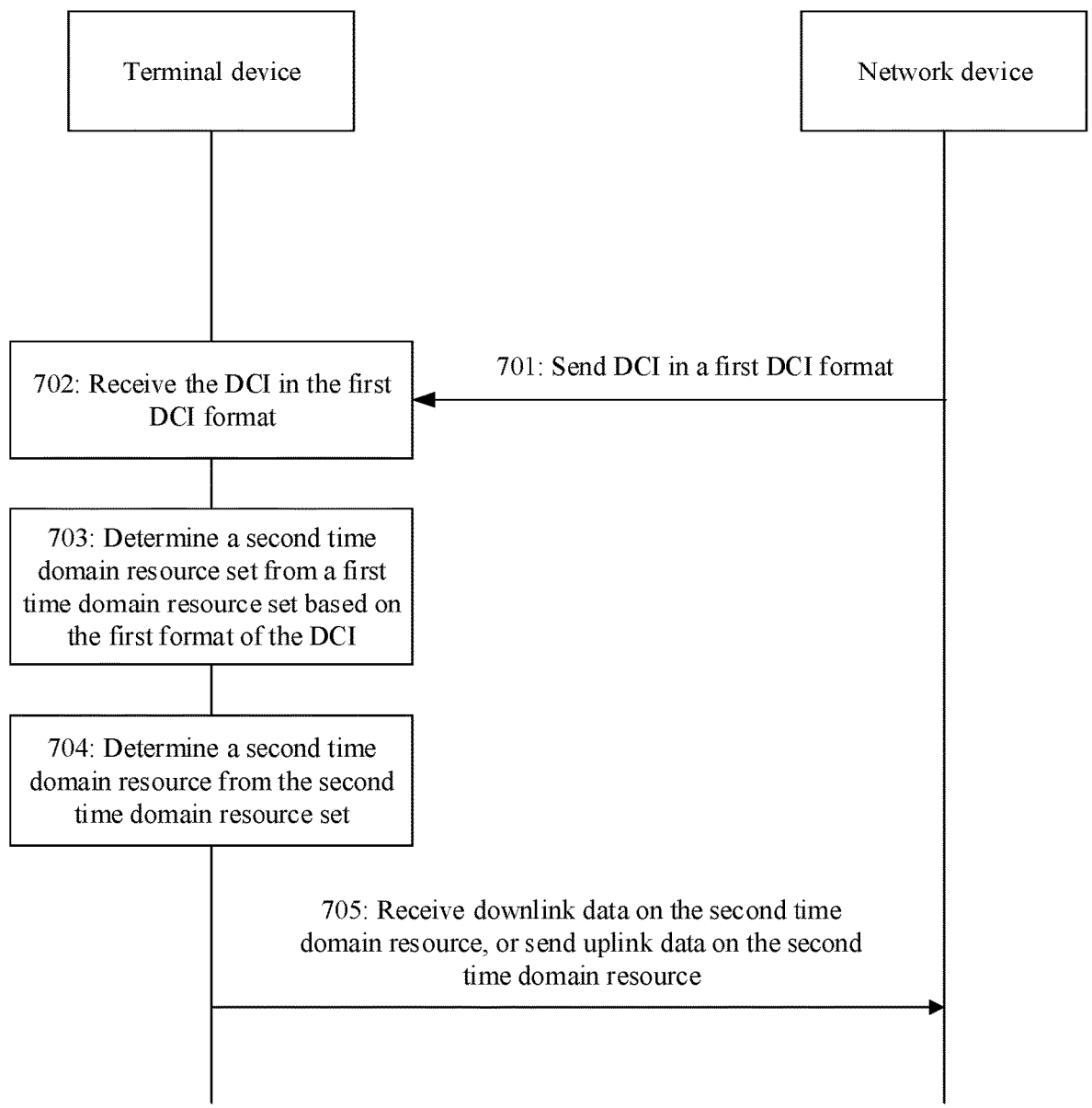
FIG. 7 is a schematic flowchart of a fifth communication method according to an embodiment of this application.

It is assumed that higher layer signaling is used to configure only one time domain resource table for uplink transmission of a terminal device. In this case, regardless of whether the terminal device receives normal DCI or compact DCI, the terminal device may randomly determine a time domain resource from the time domain resource table. However, time domain resources corresponding to some rows in the time domain resource table are inapplicable to some DCI formats. For example, if the normal DCI sent by the network device to the terminal device is configured as slot-level repetition, time domain resources corresponding to cross-boundary rows in the time domain resource table cannot be used. For another example, if the compact DCI is configured as mini-slot-level repetition, a row of the mapping type A in the time domain resource table cannot be used. Therefore, a mechanism is required to ensure that a time domain resource table corresponding to a DCI format of DCI delivered by the network device can correspond to a time domain repetition manner configured for the DCI format. In view of this, an embodiment of this application provides a schematic flowchart of a fifth communication method, as shown in FIG. 7. The method is applicable to a GB scheduling scenario, and may be performed by a terminal device. Referring to FIG. 7, the method includes the following steps.

Step 701: A network device sends DCI in a first DCI format to the terminal device.

For example, the network device sends DCI in a normal DCI format or DCI in a compact DCI format to the terminal device.

Step 702: The terminal device receives the DCI from the network device.

Step 703: The terminal device determines a second time domain resource set from a first time domain resource set based on the first DCI format of the DCI.

Specifically, the terminal device may determine the second time domain resource set based on information such as a time domain repetition manner of the first time domain resource set and the DCI of the first DCI format according to a pre-agreed rule. For a specific rule, refer to the following.

Step 704: The terminal device determines a second time domain resource from the second time domain resource set.

Step 705: The terminal device receives downlink data on the second time domain resource, or sends uplink data on the second time domain resource.

The following describes various cases of determining the second time domain resource set in step 704 in the embodiment shown in FIG. 7.

Example 1: In a possible embodiment, the terminal device may further receive fourth indication information from the network device, where the fourth indication information is used to indicate a time domain repetition manner of DCI. The terminal device may determine the second time domain resource set from the first time domain resource set based on the first DCI format of the DCI and the time domain repetition manner of the DCI. In other words, the terminal device may determine, in any one or more of the following manners based on whether a DCI format is the normal DCI format or the compact DCI format and whether a mini-slot-level time domain repetition manner or a slot-level time domain repetition manner is used, the second time domain resource set that meets a condition from the first time domain resource set.

Manner 11: When the first DCI format of the DCI delivered by the network device is the normal DCI format or the compact DCI format (that is, DCI format 0_1, DCI format 0_2, DCI format 1_1, or DCI format 1_2), and the fourth indication information indicates that the time domain repetition manner of the DCI is the slot-level repetition manner, the terminal device determines, from the first time domain resource set, that a time domain resource that does not cross a slot boundary is the second time domain resource.

For example, as shown in FIG. 2C, if a start symbol in a row in the first time domain resource set is 12, a length is four symbols, and the repetition quantity is 2, it can be learned that the time domain resource crosses a boundary, and the terminal device does not select the time domain resource. On the contrary, if the time domain resource does not cross a boundary, the terminal device selects the time domain resource as the second time domain resource.

Manner 12: When the first DCI format of the DCI delivered by the network device is the normal DCI format or the compact DCI format (that is, DCI format 0_1, DCI format 0_2, DCI format 1_1, or DCI format 1_2), and the fourth indication information indicates that the time domain repetition manner of the DCI is the slot-level repetition manner, the terminal device determines, from the first time domain resource set, that a time domain resource that does not include repetition quantity information is the second time domain resource.

For example, the first time domain resource set is a time domain resource table shown in Table 5. The terminal device determines that a time domain resource whose repetition quantity R is not 0 in Table 5 is the second time domain resource. In other words, the terminal device does not select the time domain resource corresponding to the row number 1 in Table 1, but selects a time domain resource corresponding to the row number 2, the row number 3, or the row number 16 as the second time domain resource.

TABLE 5

| Row index (row number) | PUSCH/PDSCH mapping type | K2/K1 | SLIV or S/L | Repetition quantity R |
|---|---|---|---|---|
| 1 | Type A | x | x | 0 |
| 2 | Type B | x | x | 2 |
| 2 | Type B | x | x | 2 |
| ... | ... | ... | ... | ... |
| 16 | Type B | x | x | 3 |

Manner 13: When the first DCI format of the DCI delivered by the network device is any one of DCI format 0_1, DCI format 0_2, DCI format 1_1, and DCI format 1_2, and the time domain repetition manner of the DCI is the mini-slot-level repetition manner, the terminal device determines, from the first time domain resource set, a time domain resource whose mapping type is mapping type B as the second time domain resource, or the terminal device determines, from the first time domain resource set, a time domain resource including repetition quantity information as the second time domain resource.

For example, the first time domain resource set is a time domain resource table shown in Table 5. The terminal device determines that a time domain resource whose mapping type B is Type B in Table 5 is the second time domain resource. In other words, the terminal device does not select the time domain resource corresponding to the row number 1 in Table 1, but selects a time domain resource corresponding to the row number 2, the row number 3, or the row number 16 as the second time domain resource.

For another example, the terminal device determines that a time domain resource whose repetition quantity R is not 0 in Table 5 is the second time domain resource, or the terminal device determines that a time domain resource whose repetition quantity R exists in Table 5 is the second time domain resource. In other words, the terminal device does not select the time domain resource corresponding to the row number 1 in Table 1, but selects a time domain resource corresponding to the row number 2, the row number 3, or the row number 16 as the second time domain resource.

Manner 14: When the first DCI format of the DCI delivered by the network device is fallback DCI (that is, DCI format 0_0 or DCI format 1_0), the terminal device determines, from the first time domain resource set, a time domain resource that does not cross a slot boundary as the second time domain resource.

For example, the network device delivers DCI in a fallback DCI format to the terminal device. The terminal device does not select a cross-boundary time domain resource shown in FIG. 2C. On the contrary, the terminal device selects another non-cross-boundary time domain resource as the second time domain resource.

Manner 15: When the first DCI format of the DCI delivered by the network device is fallback DCI (that is, DCI format 0_0 or DCI format 1_0), the terminal device determines, from the first time domain resource set, a time domain resource that does not include repetition quantity information as the second time domain resource.

For example, the network device delivers DCI in a fallback DCI format to the terminal device. The terminal device determines that a time domain resource whose repetition quantity R is not 0 in Table 5 is the second time domain resource. In other words, the terminal device does not select the time domain resource corresponding to the row number 1 in Table 1, but selects a time domain resource corresponding to the row number 2, the row number 3, or the row number 16 as the second time domain resource.

Manner 16: When the first DCI format of the DCI delivered by the network device is fallback DCI (that is, DCI format 0_0 or DCI format 1_0), the terminal device determines the second time domain resource in the manner shown in Table 3, where the second time domain resource is all time domain resources included in the time domain resource set determined according to Table 3.

It should be noted that for Manner 13 to Manner 16, in a possible embodiment, when determining that the first DCI format of the DCI is DCI in the fallback DCI format, the terminal device further needs to determine whether the DCI meets a first condition. If the DCI meets the first condition, the second time domain resource is determined according to the corresponding method in Manner 13 to Manner 16.

The first condition is: A scrambling manner of the DCI is any one of a C-RNTI, an MCS-C-RNTI, a TC-RNTI, and a CS-RNTI, and a PDCCH corresponding to the DCI is received in a first search space, where the first search space is a common search space (CSS), and a control resource set CORESET associated with the CSS is not CORESET 0; or the first search space is a terminal device-specific search space (USS).

Figure 8:
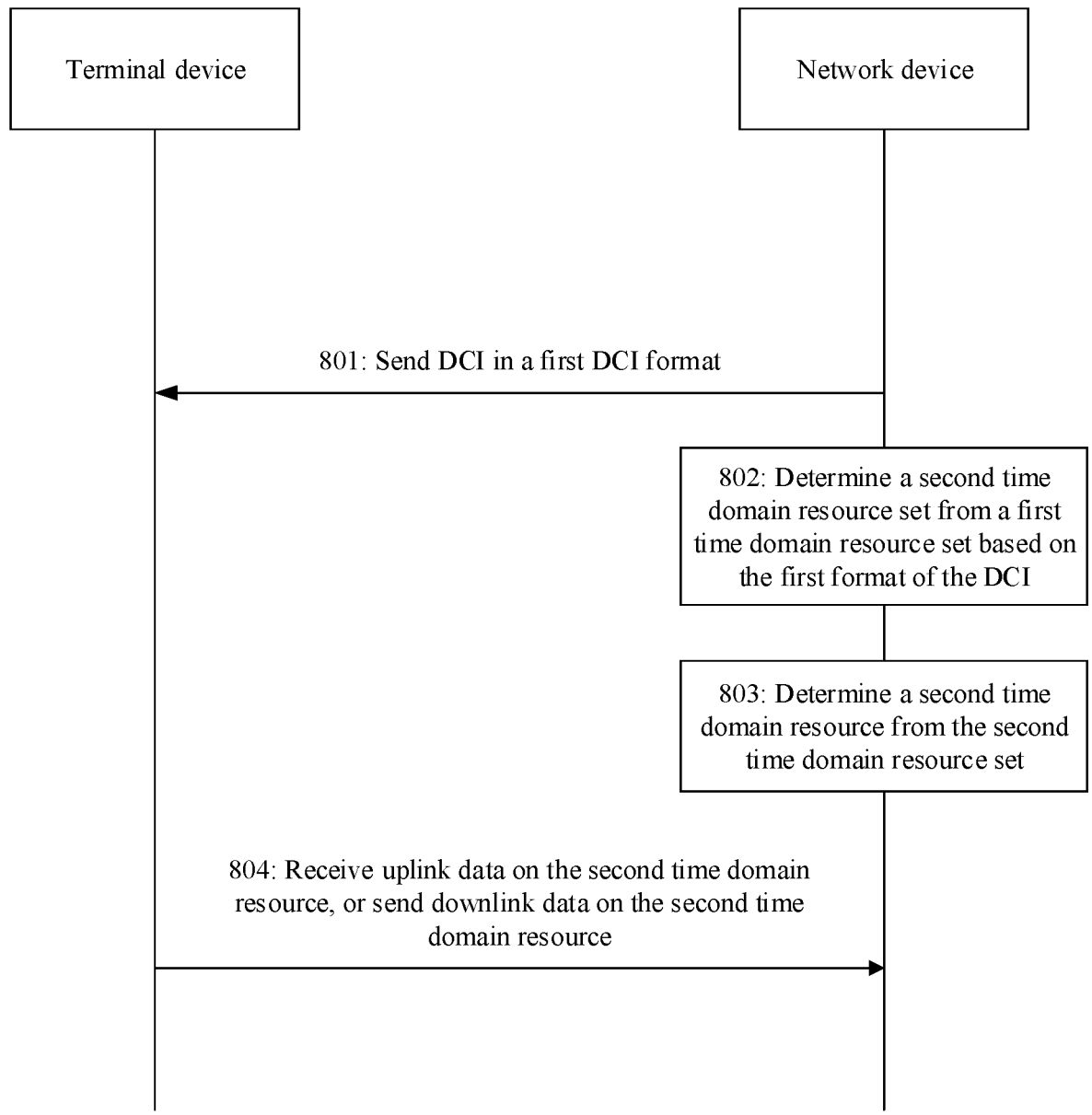
FIG. 8 is a schematic flowchart of a sixth communication method according to an embodiment of this application.

As shown in FIG. 8, an embodiment of this application provides a schematic flowchart of a sixth communication method. The method is applicable to a GF scheduling scenario, and may be performed by a network device. Referring to FIG. 8, the method includes the following steps.

Step 801: The network device sends DCI to the terminal device, where the DCI is in a first DCI format.

For example, the network device sends DCI in a normal DCI format or DCI in a compact DCI format to the terminal device.

Step 802: The network device determines a second time domain resource set from a first time domain resource set based on the first DCI format of the DCI.

Specifically, the network device may determine the second time domain resource set based on information such as a time domain repetition manner of the first time domain resource set and the DCI of the first DCI format according to a pre-agreed rule. For a specific rule, refer to the following.

Step 803: The network device determines a second time domain resource from the second time domain resource set.

Step 804: The network device receives uplink data on the second time domain resource, or sends uplink data on the second time domain resource.

For various cases of determining the third time domain resource set in step 803 in the embodiment shown in FIG. 8, refer to the foregoing description in FIG. 7. Details are not described herein again.

In this embodiment of this application, when a time domain resource table is configured at a higher layer, for each of a normal DCI format and a compact DCI format, a row that conforms to a time domain repetition manner corresponding to the DCI format is selected from the time domain resource table for indication, so that a quantity of bits in the DCI format can be reduced, and reducing the quantity of bits of the DCI ensures reliability of the DCI. For example, there are 64 rows in the time domain resource table, 32 rows are cross-boundary, and 32 rows are non-cross-boundary. If a DCI format supports only slot repetition, the 32 non-cross-boundary rows may be selected from the 64 rows for the DCI format. In other words, a quantity of bits in the DCI is 5, and 6 bits do not need to be occupied to indicate 64 values. For fallback DCI, there is only one table. In this case, the table can be directly used to avoid blurring. The fallback DCI does not support mini-slot repetition. Therefore, SLIVs that meet the slot repetition requirement need to be selected from this table. Alternatively, a time domain resource table is configured in time. For fallback DCI, a time domain resource table predefined in a protocol is directly selected to reduce complexity. Therefore, it can be ensured that the base station and the terminal device have a same understanding, thereby ensuring communication reliability.

The following describes, with reference to the accompanying drawings, communications apparatuses configured to implement the foregoing methods in the embodiments of this application. Therefore, all the foregoing content may be used in subsequent embodiments, and repeated content is not described again.

Figure 9:
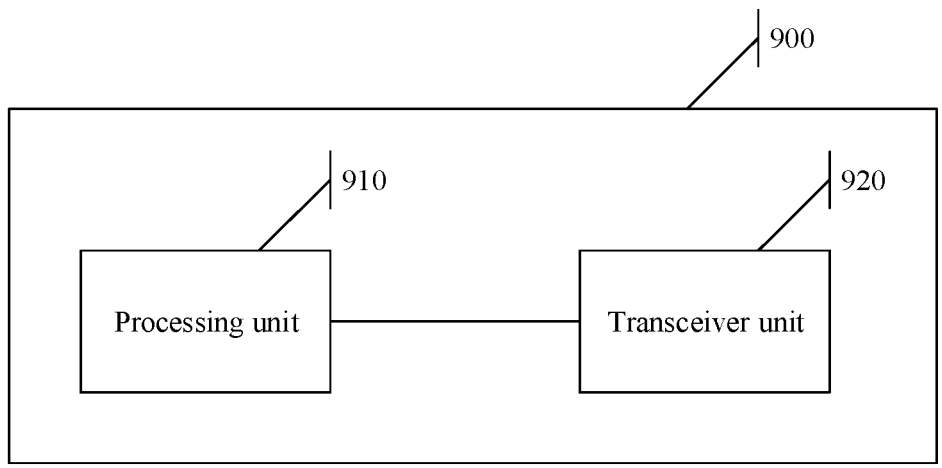
FIG. 9 is a schematic structural diagram of a communications apparatus according to an embodiment of this application.

FIG. 9 is a schematic block diagram of a communications apparatus 900 according to an embodiment of this application. The communications apparatus 900 can perform actions and functions of the terminal device in the foregoing method embodiments. To avoid repetition, details are not described herein again. The communications apparatus 900 may be a terminal device, or may be a chip applied to a terminal device. The communications apparatus 900 includes a processing unit 910 and a transceiver unit 920.

When the communications apparatus is configured to perform the first communication method, the processing unit 910 is specifically configured to: determine at least one time domain resource set, where each of the at least one time domain resource set corresponds to one DCI format; determine a third time domain resource set for grant free scheduling based on the at least one time domain resource set; and determine a third time domain resource from the third time domain resource set.

The transceiver unit 920 is configured to send uplink data to a network device on the third time domain resource, or receive downlink data on the third time domain resource.

All related content of the steps in the embodiment of the first communication method may be cited in function descriptions of a corresponding function module. Details are not described herein again.

When the communications apparatus is configured to perform the third communication method, the transceiver unit 920 is configured to receive two time domain resource sets from the network device. The transceiver unit 920 is further configured to receive DCI in a third DCI format from the network device.

The processing unit 910 is specifically configured to: determine a third time domain resource set corresponding to the DCI in the third DCI format, where the third time domain resource set is one of the two time domain sets; and determine a third time domain resource from the third time domain resource set.

The transceiver unit 920 is further configured to send uplink data on the third time domain resource, or receive downlink data on the third time domain resource.

All related content of the steps in the embodiment of the third communication method may be cited in function descriptions of a corresponding function module. Details are not described herein again.

When the communications apparatus is configured to perform the fifth communication method, the transceiver unit 920 is configured to receive DCI from the network device. The processing unit 910 is specifically configured to: determine a second time domain resource set from a first time domain resource set based on a first DCI format of DCI, and determine a second time domain resource from the second time domain resource set.

The transceiver unit 920 is further configured to receive downlink data on the second time domain resource, or send uplink data on the second time domain resource.

All related content of the steps in the embodiment of the fifth communication method may be cited in function descriptions of a corresponding function module. Details are not described herein again.

Figure 10:
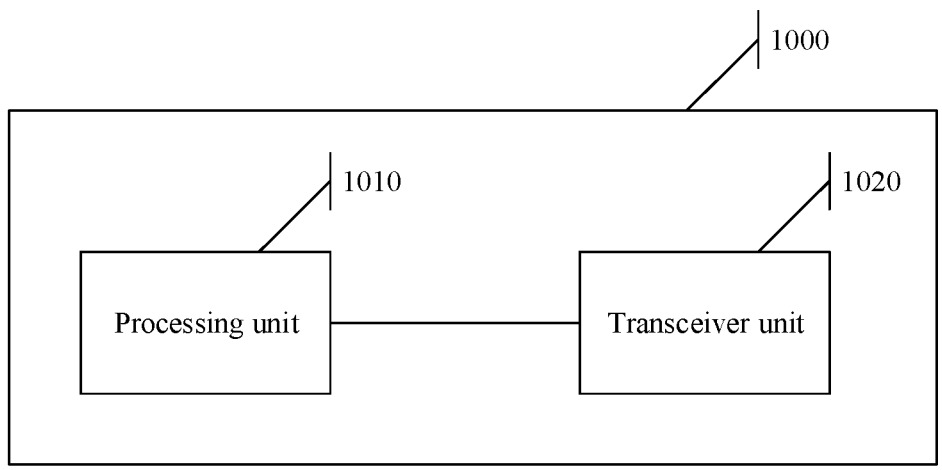
FIG. 10 is a schematic structural diagram of another communications apparatus according to an embodiment of this application.

FIG. 10 is a schematic block diagram of a communications apparatus 1000 according to an embodiment of this application. The communications apparatus 1000 can perform actions and functions of the network device in the foregoing method embodiments. To avoid repetition, details are not described herein again. The communications apparatus 1000 may be a network device, or may be a chip applied to a network device. The communications apparatus 1000 includes a processing unit 1010 and a transceiver unit 1020.

When the communications apparatus is configured to perform the second communication method, the processing unit 1020 is specifically configured to determine at least one time domain resource set, where each of the at least one time domain resource set corresponds to one DCI format; determine a third time domain resource set for grant free scheduling based on the at least one time domain resource set; and determine a third time domain resource from the third time domain resource set.

The transceiver unit 1020 is configured to send downlink data to a terminal device on the third time domain resource, or receive uplink data on the third time domain resource.

All related content of the steps in the embodiment of the second communication method may be cited in function descriptions of a corresponding function module. Details are not described herein again.

When the communications apparatus is configured to perform the fourth communication method, the processing unit 1010 is specifically configured to determine two time domain resource sets.

The transceiver unit 1020 is configured to send DCI in a third DCI format to a terminal device.

The processing unit 1010 is further configured to: determine a third time domain resource set corresponding to the DCI in the third DCI format, where the third time domain resource set is one of the two time domain sets; and determine a third time domain resource from the third time domain resource set.

The transceiver unit 1020 is further configured to send downlink data on the third time domain resource, or receive uplink data on the third time domain resource.

All related content of the steps in the embodiment of the fourth communication method may be cited in function descriptions of a corresponding function module. Details are not described herein again.

When the communications apparatus is configured to perform the sixth communication method, the transceiver unit 1020 is configured to send DCI to a terminal device, where a format of the DCI is a first DCI format.

The processing unit 1010 is specifically configured to: determine a second time domain resource set from a first time domain resource set based on the first DCI format of the DCI, and determine a second time domain resource from the second time domain resource set.

The transceiver unit 1020 is further configured to receive uplink data on the second time domain resource, or send downlink data on the second time domain resource.

All related content of the steps in the embodiment of the sixth communication method may be cited in function descriptions of a corresponding function module. Details are not described herein again.

Figure 11:
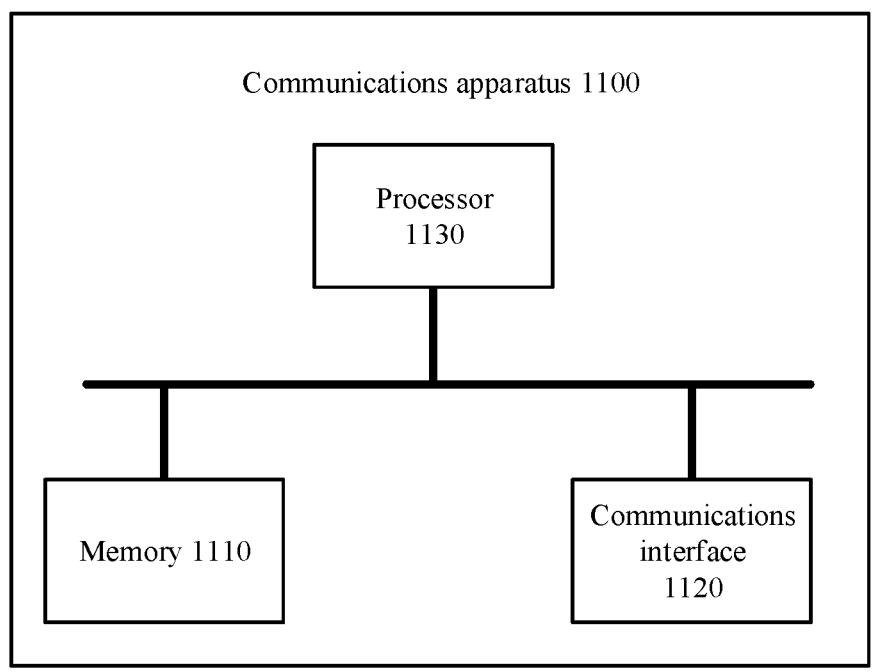
FIG. 11 is another schematic structural diagram of a communications apparatus according to an embodiment of this application.

FIG. 11 is a schematic block diagram of a communications apparatus 1100 according to an embodiment of this application. The communications apparatus 1100 can perform the steps performed by the terminal device in the foregoing method embodiments, or may be configured to perform the steps performed by the network device in the foregoing method embodiments. To avoid repetition, details are not described herein again. The communications apparatus 1100 may be a terminal device, or may be a chip applied to a terminal device. The communications apparatus 1100 may further be a network device, or may be a chip applied to a network device. The communications apparatus 1100 includes: a memory 1110, configured to store a program; and a communications interface 1120, configured to communicate with other devices.

The processor 1130 is configured to execute the program in the memory. When the communications apparatus 1100 can perform the steps performed by the terminal device in the foregoing method embodiments, the processor 1130 may perform the functions corresponding to the processing unit 910 in FIG. 9. When the communications apparatus 1100 can perform the steps performed by the network device in the foregoing method embodiments, the processor 1130 may perform the functions corresponding to the processing unit 1010 in FIG. 10.

It should be understood that the communications apparatus 1100 shown in FIG. 11 may be a chip or a circuit, for example, a chip or a circuit that may be disposed in the terminal device or a chip or a circuit that may be disposed in the network device. The communications interface 1120 may be a transceiver. The transceiver includes a receiver and a transmitter. Further, the communications apparatus 1100 may further include a bus system.

The processor 1130, the memory 1110, the receiver, and the transmitter are connected to each other through the bus system. The processor 1130 is configured to execute an instruction stored in the memory 1110, to control the receiver to receive a signal, to control the transmitter to send a signal, and to complete steps of the network device in the communications method in this application. The receiver and the transmitter may be a same physical entity or different physical entities. When being the same physical entity, the receiver and the transmitter may be collectively referred to as a transceiver. The memory 1110 may be integrated in the processor 1130, or may be disposed separately from the processor 1130.

In an implementation, functions of the receiver and the transmitter may be considered to be implemented through a transceiver circuit or a dedicated transceiver chip. It may be considered that the processor is implemented by using a dedicated processing chip, a processing circuit, or a processor, or a general-purpose chip.

In this embodiment of this application, a specific connection medium between the communications interface 1120, the processor 1130, and the memory 1110 is not limited. In this embodiment of this application, in FIG. 11, the memory 1110, the processor 1130, and the communications interface 1120 are connected through a bus. The bus is represented by a thick line in FIG. 11. A connection manner between other components is merely an example for description, and imposes no limitation. The bus may be classified into an address bus, a data bus, a control bus, and the like. For ease of representation, only one thick line is used to represent the bus in FIG. 11, but this does not mean that there is only one bus or only one type of bus.

In this embodiment of this application, the processor 1130 may be a general-purpose processor, a digital signal processor, an application-specific integrated circuit, a field programmable gate array or another programmable logic device, a discrete gate or a transistor logic device, or a discrete hardware component, and may implement or perform the methods, the steps, and logical block diagrams disclosed in the embodiments of this application. The general-purpose processor may be a microprocessor, any conventional processor, or the like. The steps of the method disclosed with reference to the embodiments of this application may be directly performed by a hardware processor, or may be performed by using a combination of hardware in the processor and a software module.

In the embodiments of this application, the memory 1110 may be a nonvolatile memory, such as a hard disk drive (HDD) or a solid-state drive (SSD), or may be a volatile memory, such as a random access memory (RAM). The memory is any other medium that can be used to carry or store expected program code in a form of an instruction or a data structure and that can be accessed by a computer, but is not limited thereto. The memory in this embodiment of this application may alternatively be a circuit or any other apparatus that can implement a storage function, and is configured to store a program instruction and/or data.

It should be noted that the communications apparatus in the foregoing embodiment may be a terminal device, or may be a circuit, or may be a chip applied to a terminal device, or another component or combined component that has a function of the foregoing terminal device. When the communications apparatus is a terminal device, the transceiver unit may be a transceiver, and may include an antenna, a radio frequency circuit, and the like, and the processing module may be a processor, for example, a central processing unit (CPU). When the communications apparatus is a component having functions of the foregoing terminal device, the transceiver unit may be a radio frequency unit, and the processing module may be a processor. When the communications apparatus is a chip system, the transceiver unit may be an input/output interface of the chip system, and the processing module may be a processor of the chip system.

Figure 12:
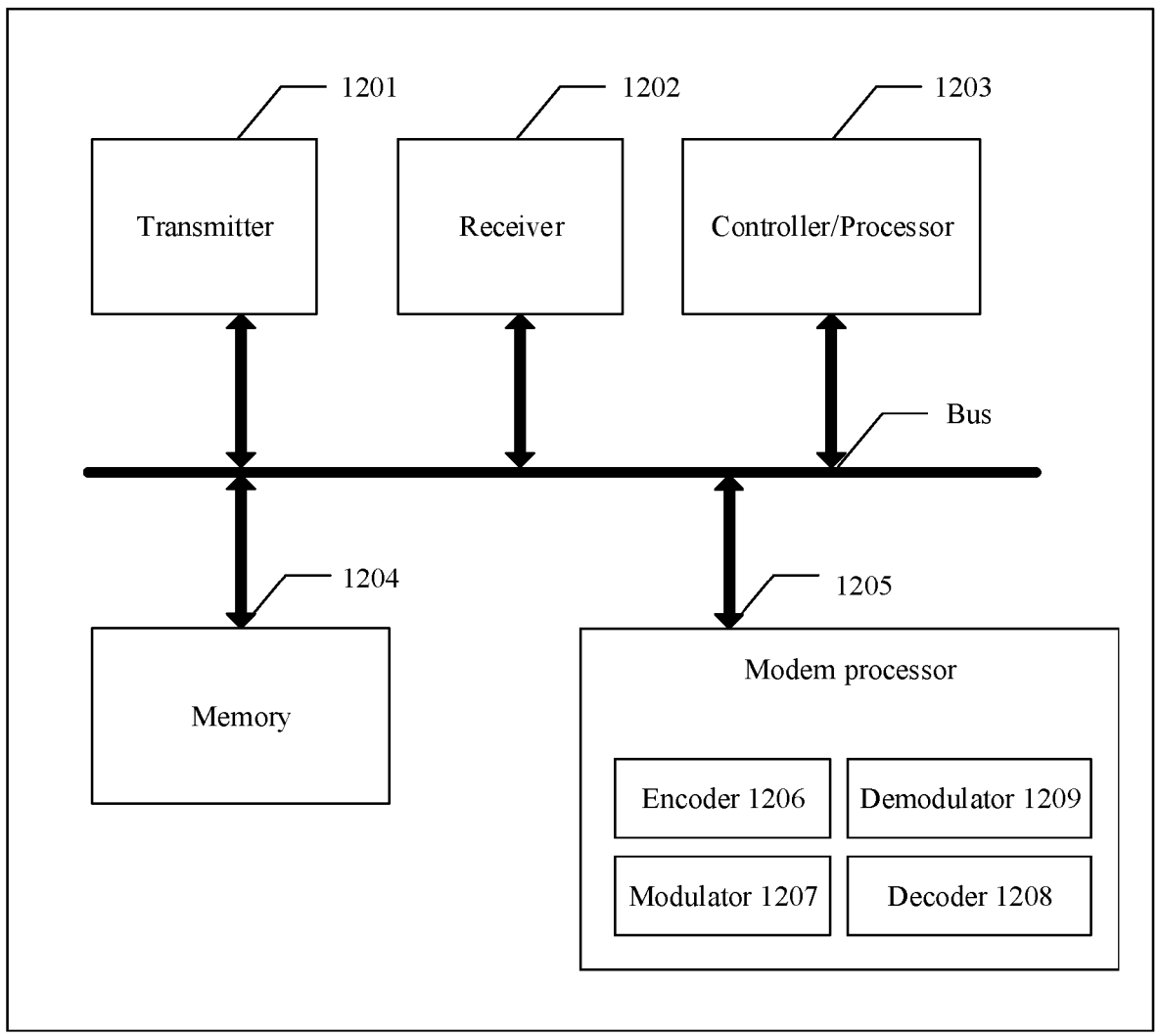
FIG. 12 is still another schematic structural diagram of a communications apparatus according to an embodiment of this application.

FIG. 12 is a simplified schematic diagram of a possible design structure of a terminal device in the foregoing embodiments. The terminal device includes a transmitter 1201, a receiver 1202, a controller/processor 1203, a memory 1204, and a modem processor 1205.

The transmitter 1201 is configured to send an uplink signal, and the uplink signal is transmitted to the network device in the foregoing embodiment by using an antenna. On a downlink, the antenna receives a downlink signal (DCI) transmitted by the network device in the foregoing embodiments. The receiver 1202 is configured to receive the downlink signal (DCI) received from the antenna. In the modem processor 1205, the encoder 1206 receives service data and a signaling message that are to be sent in an uplink, and processes the service data and the signaling message. The modulator 1207 further processes (for example, performs symbol mapping and modulation) the encoded service data and signaling message and provides an output sample. The demodulator 1209 processes (for example, demodulates) the input sampling and provides symbol estimation. The decoder 1208 processes (for example, decodes) the symbol estimation and provides decoded data and a decoded signaling message to the terminal device. The encoder 1206, the modulator 1207, the demodulator 1209, and the decoder 1208 may be implemented by the combined modem processor 1205. The units perform processing based on a radio access technology used by a radio access network.

The controller/processor 1203 controls and manages an action of the terminal device and is configured to perform processing implemented by the terminal device in the foregoing embodiments. For example, the controller/processor 1203 is configured to: control the terminal device to receive second indication information from the network device, and determine a time domain repetition manner of grant free scheduling based on a time domain repetition manner of a first DCI format and a time domain repetition manner of a second DCI format that are indicated by the received second indication information.

Figure 13:
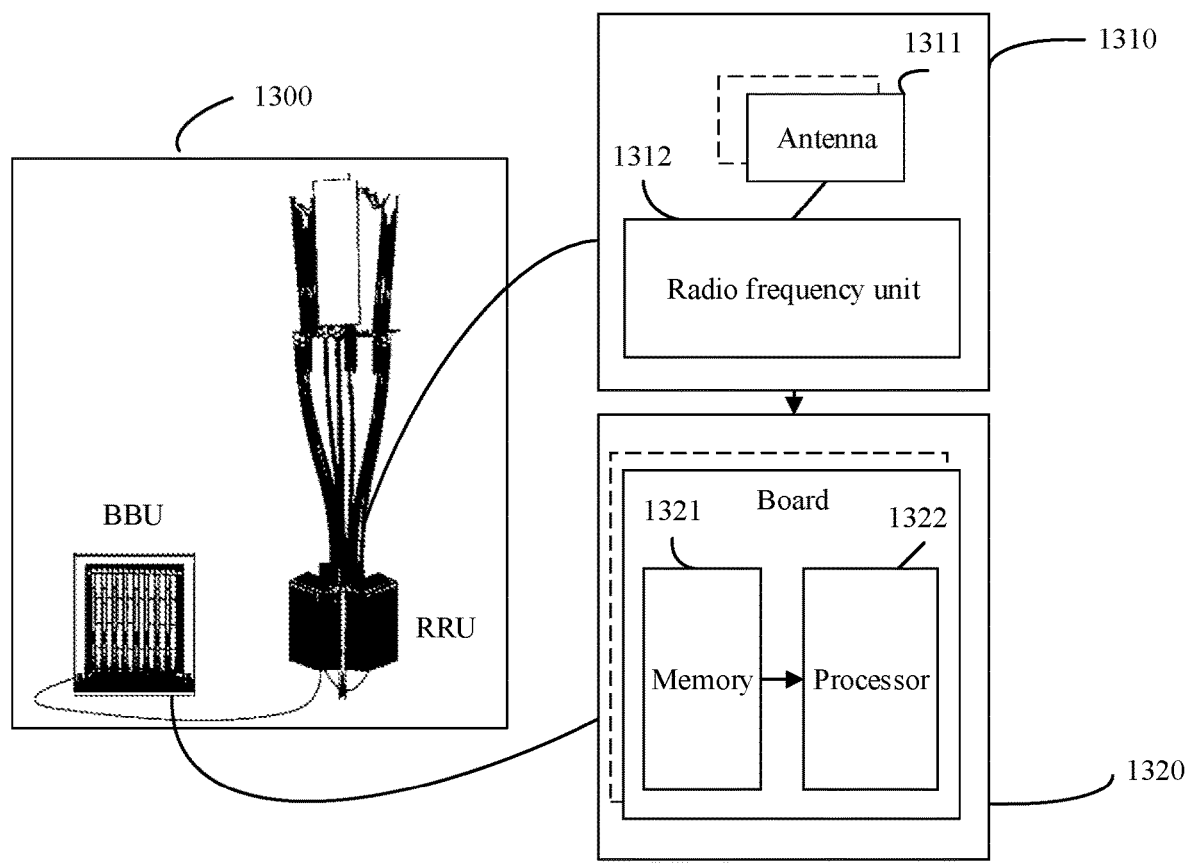
FIG. 13 is another schematic structural diagram of another communications apparatus according to an embodiment of this application.

FIG. 13 is a simplified schematic structural diagram of a communications apparatus. For ease of understanding and illustration, in FIG. 13, a network device is used as an example of the communications apparatus. The network device 1300 includes one or more radio frequency units, such as a remote radio unit (RRU) 1310 and one or more baseband units (BBU) (which may also be referred to as a digital unit (DU)) 1320. The RRU 1310 may be referred to as a communications module, and corresponds to the transceiver module 1020 in FIG. 10. Optionally, the communications module may also be referred to as a transceiver machine, a transceiver circuit, a transceiver, or the like, and may include at least one antenna 1311 and a radio frequency unit 1312. The RRU 1310 is mainly configured to: receive and send a radio frequency signal, and perform conversion between a radio frequency signal and a baseband signal. For example, the RRU 1310 is configured to send indication information to a terminal device. The BBU 1320 is mainly configured to perform baseband processing, control a base station, and the like. The RRU 1310 and the BBU 1320 may be physically disposed together, or may be physically disposed separately, that is, in a distributed base station.

The BBU 1320 is a control center of the base station, and may also be referred to as a processing module. The BBU 1320 may correspond to the processing unit 1010 in FIG. 10, and is mainly configured to implement a baseband processing function such as channel coding, multiplexing, modulation, or spreading. For example, the BBU (processing module) may be configured to control the base station to perform an operation procedure related to the network device in the foregoing method embodiments, for example, generate the foregoing indication information.

In an example, the BBU 1320 may include one or more boards, and a plurality of boards may jointly support a radio access network (for example, an LTE network) having a single access standard, or may separately support radio access networks (for example, an LTE network, a 5G network, or another network) having different access standards. The BBU 1320 further includes a memory 1321 and a processor 1322. The memory 1321 is configured to store a necessary instruction and necessary data. The processor 1322 is configured to control the based station to perform a necessary action, for example, is configured to control the base station to perform an operation procedure related to the network device in the foregoing method embodiments. The memory 1321 and the processor 1322 may serve the one or more boards. In other words, each board may be independently disposed with a memory and a processor. Alternatively, a plurality of boards may share a same memory and a same processor. In addition, each board may further disposed with a necessary circuit.

An embodiment of this application further provides a communications system. Specifically, the communications system includes a terminal device and a network device, or may further include more terminal devices and network devices.

The terminal device and the network device are respectively configured to implement functions of the related devices in FIG. 3 to FIG. 8. For details, refer to related descriptions in the method embodiments. Details are not described herein again.

An embodiment of this application further provides a computer readable storage medium, including an instruction. When the instruction is run on a computer, the computer performs the methods performed by the terminal device and the network device in FIG. 3 to FIG. 8.

An embodiment of this application further provides a computer program product, including an instruction. When the instruction is run on a computer, the computer performs the methods performed by the terminal device and the network device in FIG. 3 to FIG. 8.

An embodiment of this application provides a chip system. The chip system includes a processor, and may further include a memory, to implement functions of the terminal device and the network device in the foregoing method. The chip system may include a chip, or may include a chip and another discrete component.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the embodiments provided in this application, it should be understood that the described apparatus embodiments are merely examples. For example, the unit division is merely logical function division and may be other division in actual implementation, for example, a plurality of units or components may be combined or integrated into another system, or some features may be ignored or not performed. In addition, the displayed or discussed mutual communication connections may be implemented through some interfaces. The indirect couplings or communication connections between the apparatuses or units may be implemented in electronic, mechanical, or other forms.

In addition, units in the apparatus embodiments of this application may be integrated into one processing unit, or each of the units may exist alone physically, or two or more units may be integrated into one unit.

It may be understood that, the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general purpose processor may be a microprocessor or any regular processor or the like.

All or some of the methods in the embodiments of this application may be implemented by software, hardware, firmware, or any combination thereof. When software is used to implement the embodiments, the embodiments may be implemented completely or partially in a form of a computer program product. The computer program product includes one or more computer programs or instructions. When the computer program or the instruction is loaded and executed on a computer, procedures or functions in the embodiments of this application are all or partially performed. The computer may be a general-purpose computer, a dedicated computer, a computer network, or another programmable apparatus. The computer programs or instructions may be stored in a computer readable storage medium, or may be transmitted from one computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, wireless, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a network device or a terminal device. Certainly, the processor and the storage medium may exist in a sending device or a receiving device as discrete components.

In the embodiments of this application, unless otherwise stated or there is a logical conflict, terms and/or descriptions between different embodiments are consistent and may be mutually referenced, and technical features in different embodiments may be combined according to an internal logical relationship thereof, to form a new embodiment.

It may be understood that numerical symbols involved in the embodiments of this application are differentiated merely for ease of description, but are not used to limit the scope of the embodiments of this application. Sequence numbers of the foregoing processes do not mean execution sequences. The execution sequences of the processes should be determined based on functions and internal logic of the processes.

It is clear that a person skilled in the art can make various modifications and variations to this application without departing from the scope of this application. If these modifications and variations of this application fall within the scope of the claims of this application and their equivalent technologies, this application is also intended to cover these modifications and variations.

What is claimed is:

1. A communication method, comprising:
    determining at least one time domain resource set, wherein each of the at least one time domain resource set corresponds to one downlink control information (DCI) format, wherein the at least one time domain resource set comprises a first time domain resource set corresponding to a first DCI format and a second time domain resource set corresponding to a second DCI format;

receiving first indication information, wherein the first indication information is used to indicate a time domain repetition manner of grant free scheduling;

receiving second indication information, wherein the second indication information is used to indicate a time domain repetition manner of the first DCI format and a time domain repetition manner of the second DCI format;

determining a third time domain resource set for grant free scheduling based on the time domain repetition manner of grant free scheduling and the at least one time domain resource set, wherein the determining the third time domain resource set comprises:
  determining the first time domain resource set as the third time domain resource set for grant free scheduling based on that the time domain repetition manner of the first DCI format is the same as the time domain repetition manner of grant free scheduling; or
  determining the second time domain resource set as the third time domain resource set for grant free scheduling based on that the time domain repetition manner of the second DCI format is the same as the time domain repetition manner of grant free scheduling:

determining a third time domain resource from the third time domain resource set; and sending uplink data on the third time domain resource, or receiving downlink data on the third time domain resource.

2. The method according to claim 1, wherein the time domain repetition manner is a mini-slot-level time domain repetition manner or a slot-level time domain repetition manner.

3. The method according to claim 1, wherein the first DCI format is DCI format 0_1, and the second DCI format is DCI format 0_2.

4. A communication method, comprising:
determining at least one time domain resource set, wherein each of the at least one time domain resource set corresponds to one downlink control information (DCI) format, wherein the at least one time domain resource set comprises a first time domain resource set corresponding to a first DCI format and a second time domain resource set corresponding to a second DCI format;

sending first indication information, wherein the first indication information is used to indicate a time domain repetition manner of grant free scheduling;

sending second indication information, wherein the second indication information is used to indicate a time domain repetition manner of the first DCI format and a time domain repetition manner of the second DCI format;

determining a third time domain resource from a third time domain resource set, wherein the third time domain resource set is the first time domain resource set when the time domain repetition manner of the first DCI format is the same as the time domain repetition manner of grant free scheduling; or the third time domain resource set is the second time domain resource set when the time domain repetition manner of the second DCI format is the same as the time domain repetition manner of grant free scheduling; and sending downlink data on the third time domain resource, or receiving uplink data on the third time domain resource.

5. The method according to claim 4, wherein the time domain repetition manner is a mini-slot-level time domain repetition manner or a slot-level time domain repetition manner.

6. The method according to claim 4, further comprising:
sending radio resource control (RRC) signaling, wherein the RRC signaling is used to indicate the first time domain resource set corresponding to the first DCI format and the second time domain resource set corresponding to the second DCI format.

7. A communications apparatus, comprising at least one processor, wherein the at least one processor is connected to a memory, and the at least one processor is configured to
determine at least one time domain resource set, wherein each of the at least one time domain resource set corresponds to one downlink control information (DCI) format, wherein the at least one time domain resource set comprises a first time domain resource set corresponding to a first DCI format and a second time domain resource set corresponding to a second DCI format;

receive first indication information, wherein the first indication information is used to indicate a time domain repetition manner of grant free scheduling;

receive second indication information, wherein the second indication information is used to indicate a time domain repetition manner of the first DCI format and a time domain repetition manner of the second DCI format;

determine a third time domain resource set for grant free scheduling based on the time domain repetition manner of grant free scheduling and the at least one time domain resource set, wherein the determining the third time domain resource set comprises:
  determine the first time domain resource set as the third time domain resource set for grant free scheduling based on that the time domain repetition manner of the first DCI format is the same as the time domain repetition manner of grant free scheduling; or
  determine the second time domain resource set as the third time domain resource set for grant free scheduling based on that the time domain repetition manner of the second DCI format is the same as the time domain repetition manner of grant free scheduling;

determine a third time domain resource from the third time domain resource set; and send uplink data on the third time domain resource, or receive downlink data on the third time domain resource.

8. A communications apparatus, comprising at least one processor, wherein the at least one processor is connected to a memory, and the at least one processor is configured to
determine at least one time domain resource set, wherein each of the at least one time domain resource set corresponds to one downlink control information (DCI) format, wherein the at least one time domain resource set comprises a first time domain resource set corresponding to a first DCI format and a second time domain resource set corresponding to a second DCI format;

send first indication information, wherein the first indication information is used to indicate a time domain repetition manner of grant free scheduling;

send second indication information, wherein the second indication information is used to indicate a time domain repetition manner of the first DCI format and a time domain repetition manner of the second DCI format;

determine a third time domain resource from a third time domain resource set, wherein the third time domain resource set is the first time domain resource set when the time domain repetition manner of the first DCI format is the same as the time domain repetition manner of grant free scheduling; or the third time domain resource set is the second time domain resource set when the time domain repetition manner of the second DCI format is the same as the time domain repetition manner of grant free scheduling; and send downlink data on the third time domain resource, or receive uplink data on the third time domain resource.

9. A non-transitory computer-readable medium storing computer-executable instructions, when executed by a processor, causing the process to perform the method according to claim 1.

10. A non-transitory computer-readable medium storing computer-executable instructions, when executed by a processor, causing the process to perform the method according to claim 4.

11. The method according to claim 1, further comprising:
receiving radio resource control (RRC) signaling, wherein the RRC signaling is used to indicate the first time domain resource set corresponding to the first DCI format and the second time domain resource set corresponding to the second DCI format.

12. The method according to claim 4, wherein the first DCI format is DCI format 0_1, and the second DCI format is DCI format 0_2.

13. The communications apparatus according to claim 7, wherein the first DCI format is DCI format 0_1, and the second DCI format is DCI format 0_2.

14. The communications apparatus according to claim 7, wherein the time domain repetition manner is a mini-slot-level time domain repetition manner or a slot-level time domain repetition manner.

15. The communications apparatus according to claim 7, wherein the at least one processor is configured to receive radio resource control (RRC) signaling, wherein the RRC signaling is used to indicate the first time domain resource set corresponding to the first DCI format and the second time domain resource set corresponding to the second DCI format.

16. The communications apparatus according to claim 8, wherein the first DCI format is DCI format 0_1, and the second DCI format is DCI format 0_2.

17. The communications apparatus according to claim 8, wherein the time domain repetition manner is a mini-slot-level time domain repetition manner or a slot-level time domain repetition manner.

18. The communications apparatus according to claim 8, wherein the at least one processor is configured to send radio resource control (RRC) signaling, wherein the RRC signaling is used to indicate the first time domain resource set corresponding to the first DCI format and the second time domain resource set corresponding to the second DCI format.

* * * * *